US011700051B2

(12) United States Patent
Ogura

(10) Patent No.: US 11,700,051 B2
(45) Date of Patent: Jul. 11, 2023

(54) RELAY APPARATUS, WIRELESS NETWORK SYSTEM, AND RELAY METHOD

(71) Applicant: Kabushiki Kaisha Toshiba, Minato-ku (JP)

(72) Inventor: Miyuki Ogura, Tachikawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 92 days.

(21) Appl. No.: 16/554,710

(22) Filed: Aug. 29, 2019

(65) Prior Publication Data

US 2020/0169314 A1 May 28, 2020

(30) Foreign Application Priority Data

Nov. 22, 2018 (JP) ................................. 2018-219616

(51) Int. Cl.
*H04B 7/14* (2006.01)
*H04W 40/22* (2009.01)

(52) U.S. Cl.
CPC .............. *H04B 7/14* (2013.01); *H04W 40/22* (2013.01)

(58) Field of Classification Search
CPC .................................. H04B 7/14; H04W 40/22
See application file for complete search history.

(56) References Cited

U.S. PATENT DOCUMENTS

| | | | |
|---|---|---|---|
| 6,546,391 B1* | 4/2003 | Tsuruoka | H04L 45/742 |
| | | | 707/999.005 |
| 6,925,069 B2 | 8/2005 | Koos, Jr. et al. | |
| 8,014,370 B2 | 9/2011 | Banerjea et al. | |
| 8,068,507 B2 | 11/2011 | Roy | |
| 8,433,799 B2* | 4/2013 | Ohta | H04W 12/08 |
| | | | 709/225 |
| 8,483,115 B2* | 7/2013 | Myojo | H04B 7/15542 |
| | | | 370/468 |
| 8,738,013 B2 | 5/2014 | Banerjea et al. | |

(Continued)

FOREIGN PATENT DOCUMENTS

| | | | |
|---|---|---|---|
| JP | 4308027 B2 | 8/2009 | |
| JP | 5149170 B2 | 2/2013 | |

(Continued)

OTHER PUBLICATIONS

"Multi-AP Specification", Wi-Fi Alliance, Version 1.0, 2018, 66 pages.

*Primary Examiner* — Derrick W Ferris
*Assistant Examiner* — Mohammed M Murshid
(74) *Attorney, Agent, or Firm* — Oblon, McClelland, Maier & Neustadt, L.L.P.

(57) ABSTRACT

According to an embodiment, a relay apparatus corresponds to a node included in nodes of a wireless network system. The relay apparatus includes wireless communication circuitry, and processor circuitry. The wireless communication circuitry includes ports capable of transmitting a transmission frame or receiving a reception frame via a wireless communication line respectively. The processor circuitry is configured to select a first port connected to a first apparatus from the ports, if the wireless communication circuitry receives a first frame and if the first frame is to be relayed to the first apparatus via a wireless communication line. The wireless communication circuitry is further configured to transmit the first frame through the first port.

16 Claims, 16 Drawing Sheets

(56) References Cited

U.S. PATENT DOCUMENTS

| | | | |
|---|---|---|---|
| 8,750,321 B2 | 6/2014 | Roy | |
| 8,898,312 B2* | 11/2014 | Kondo | H04L 43/0811 |
| | | | 709/227 |
| 8,982,894 B2* | 3/2015 | Horio | H04W 84/18 |
| | | | 455/428 |
| 9,479,428 B2 | 10/2016 | Banerjea et al. | |
| 2007/0127367 A1* | 6/2007 | Ogasahara | H04W 40/22 |
| | | | 370/328 |
| 2007/0248067 A1 | 10/2007 | Banerjea et al. | |
| 2008/0092228 A1* | 4/2008 | Baum | H04L 45/742 |
| | | | 726/13 |
| 2009/0238196 A1* | 9/2009 | Ukita | H04L 47/15 |
| | | | 370/408 |
| 2012/0051252 A1* | 3/2012 | Iwao | H04L 45/18 |
| | | | 370/252 |
| 2013/0016627 A1* | 1/2013 | Higashihara | H04L 43/10 |
| | | | 370/254 |
| 2013/0273835 A1* | 10/2013 | Myojo | H04B 7/15 |
| | | | 455/7 |
| 2014/0269729 A1* | 9/2014 | Luo | H04L 45/745 |
| | | | 370/392 |
| 2015/0139030 A1* | 5/2015 | Nomura | H04L 45/02 |
| | | | 370/254 |
| 2015/0270894 A1* | 9/2015 | Meki | H04L 12/437 |
| | | | 398/2 |
| 2015/0295635 A1* | 10/2015 | Koskiahde | H04L 12/2863 |
| | | | 370/315 |
| 2016/0380790 A1* | 12/2016 | Kaku | H04L 25/20 |
| | | | 370/315 |
| 2017/0149664 A1* | 5/2017 | Ganga | G06F 9/45558 |
| 2018/0115956 A1* | 4/2018 | Zhou | H04W 52/0206 |
| 2020/0052997 A1* | 2/2020 | Ramanathan | H04L 45/32 |

FOREIGN PATENT DOCUMENTS

| | | |
|---|---|---|
| JP | 5574190 B2 | 8/2014 |
| JP | 2017-188810 A | 10/2017 |

* cited by examiner

FIG.3

| FINAL DESTINATION IP ADDRESS | NEXT DESTINATION IP ADDRESS | TRANSMISSION MAC ADDRESS | RECEPTION MAC ADDRESS |
|---|---|---|---|
| ............ | ............ | ............ | ............ |
| ............ | ............ | ............ | ............ |
| ............ | ............ | ............ | ............ |
| ............ | ............ | ............ | ............ |
| ⋮ | ⋮ | ⋮ | ⋮ |

| FINAL DESTINATION IP ADDRESS IN DOWNLINK DIRECTION | PATH INFORMATION |
|---|---|
| X<br>Z<br>$X_1$<br>⋮ | AC → CF → FX<br>AB → BE → EY<br>AB → BD → $BX_1$<br>⋮ |

FIG.15

| | |
|---|---|
| SOURCE IP ADDRESS 1<br>DESTINATION IP ADDRESS 1<br>SOURCE IP ADDRESS 2<br>DESTINATION IP ADDRESS 2<br>SOURCE IP ADDRESS 3<br>DESTINATION IP ADDRESS 3 | A<br>C<br>C<br>F<br>F<br>X |

| NEXT DESTINATION IP ADDRESS | TRANSMISSION MAC ADDRESS | RECEPTION MAC ADDRESS |
|---|---|---|
| ............ ............ ............ | ............ ............ ............ | ............ ............ ............ |

RELAY APPARATUS, WIRELESS NETWORK SYSTEM, AND RELAY METHOD

CROSS-REFERENCE TO RELATED APPLICATIONS

This application is based upon and claims the benefit of priority from Japanese Patent Application No. 2018-219616, filed on Nov. 22, 2018; the entire contents of which are incorporated herein by reference.

FIELD

Embodiments described herein relate generally to a relay apparatus, a wireless network system, and a relay method.

BACKGROUND

In the related art, there is known a mesh network in which a plurality of relay stations are connected with each other via a wireless communication line. In relay stations used for such a mesh network, communication devices used for an uplink direction side and a downlink direction side are different from each other. Due to this, such relay stations have a large configuration for data transfer.

A mesh network in the related art includes a relay station having a controller function. The relay station having the controller function collects a radio wave environment, a traffic condition, and the like of all relay stations, and determines a connection relation among all of the relay stations. However, such a method has increased a processing load on the relay station having the controller function. In an environment in which the relay station moves, the connection relation needs to be adaptively switched. However, with such a method, it has been difficult to rapidly switch a path.

BRIEF DESCRIPTION OF THE DRAWINGS

FIG. 3 is a diagram illustrating a routing table;
FIG. 14 is a diagram illustrating a path information table;
FIG. 15 is a diagram illustrating an example of path information.

DETAILED DESCRIPTION

According to an embodiment, a relay apparatus corresponds to a node included in nodes of a wireless network system. The relay apparatus includes wireless communication circuitry, and processor circuitry. The wireless communication circuitry includes ports capable of transmitting a transmission frame or receiving a reception frame via a wireless communication line respectively. The processor circuitry is configured to select a first port connected to a first apparatus from the ports, if the wireless communication circuitry receives a first frame and if the first frame is to be relayed to the first apparatus via a wireless communication line. The wireless communication circuitry is further configured to transmit the first frame through the first port.

The following describes a network system 10 according to an embodiment with reference to the drawings. The network system 10 according to the embodiment can relay a wireless frame with a simple configuration.

Figure 1:
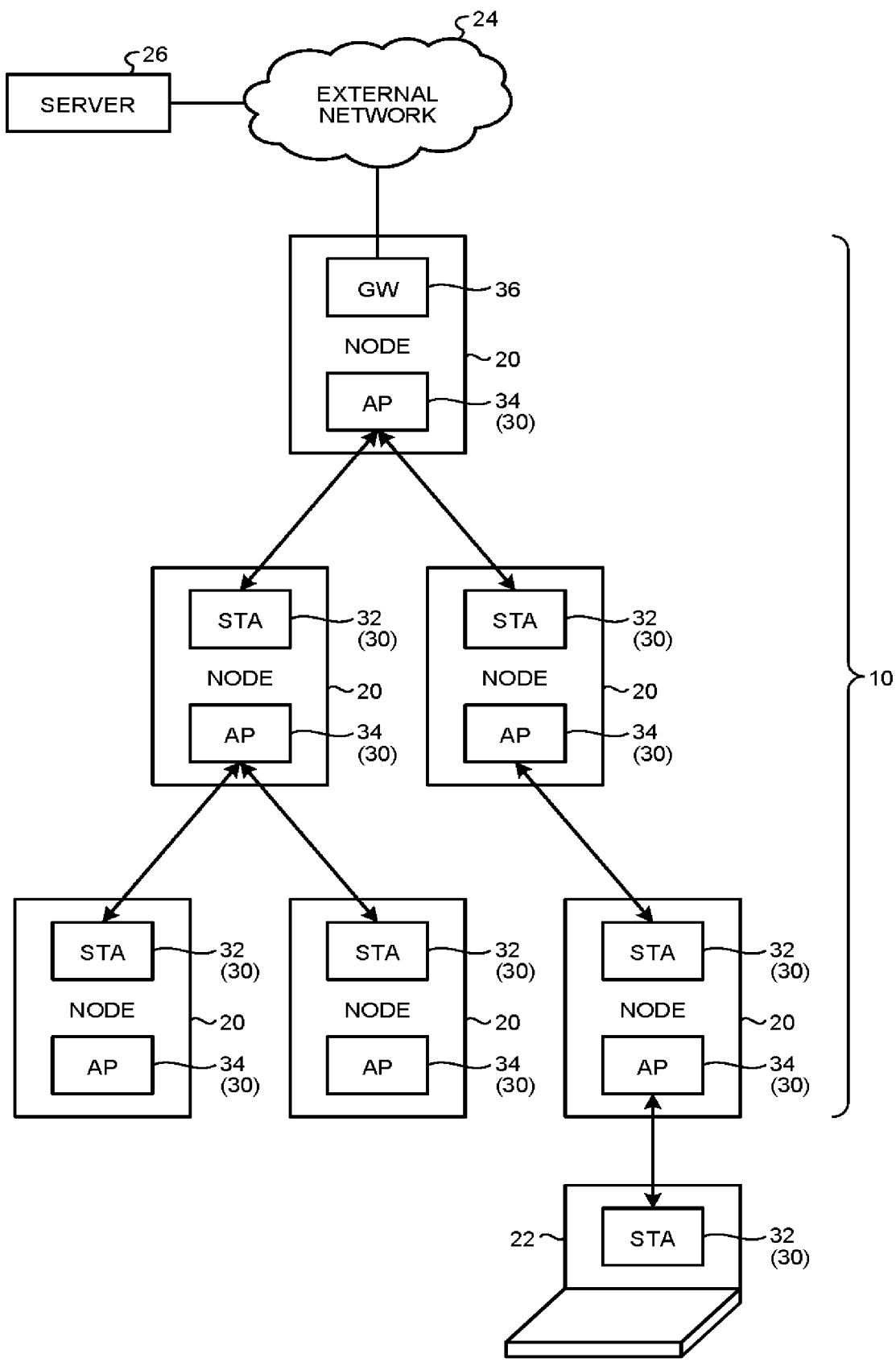
FIG. 1 is a diagram illustrating a configuration of a network system according to an embodiment.

FIG. 1 is a diagram illustrating a configuration of the network system 10 according to an embodiment. The network system 10 includes a plurality of nodes 20 (relay apparatuses) connected to each other via a wireless communication line. Any of the nodes 20 is connected to one or more terminal devices 22 via a wireless communication line. Any of the nodes 20 is connected to an external network 24.

Each of the node 20 and the terminal device 22 has a wireless communication function and an information processing function. The terminal device 22 further has a function of receiving information input by a user, or outputting information to the user. The node 20 and the terminal device 22 transmit/receive a wireless frame to/from another node 20 or another terminal device 22 in accordance with a predetermined wireless communication standard (for example, The Institute of Electrical and Electronics Engineers (IEEE) 802.11) and the like. The wireless frame is data conforming to the predetermined wireless communication standard. The wireless frame is also called Media Access Control (MAC) frame in the IEEE 802.11.

Each of the nodes 20 includes a plurality of ports 30. Each of the ports 30 transmits/receives the wireless frame to/from one or more second devices via a wireless communication line. Examples of the second devices include another node 20 or another terminal device 22. The wireless communication line is formed after performing a predetermined procedure such as authentication processing and association processing between two devices (the node 20 or the terminal device 22).

In the present embodiment, nodes 20 are connected to make a connection relation of a tree structure via a wireless communication line. In the present embodiment, the nodes 20 and the terminal device 22 operate in an infrastructure mode.

In the present embodiment, one of the ports 30 included in one node 20 is a station port 32 (STA). The station port 32 is the port 30 that can form a wireless communication line with another node 20 (parent node) upstream in the tree structure. In the present embodiment, the other one of the ports 30 included in one node 20 is an access point port 34 (AP). The access point port 34 is the port 30 that can form a wireless communication line with another node 20 (child node) or the terminal device 22 downstream in the tree structure.

In the present embodiment, the node 20 at a root position of the tree structure includes a gateway port 36 (GW) to be connected to the external network 24. The node 20 at the root position can communicate with the external network 24 such as the Internet or an external local network using an Internet Protocol (IP) via the gateway port 36. The node 20 at the root position may communicate with the external network 24 in accordance with a standard prescribed in the IEEE 802.3, for example. The node 20 at the root position may be connected to the external network 24 in accordance with a wireless communication standard of a cellular system such as Long Term Evolution (LTE) or 5G.

In the present embodiment, the terminal device 22 includes the station port 32 as the port 30 that can form a wireless communication line with the node 20. The terminal device 22 is connected to the access point port 34 included in any of the nodes 20. Each of the nodes 20 included in the network system 10 functions as a relay apparatus that relays data to be exchanged between two terminal devices 22 or between the terminal device 22 and a server 26.

Figure 2:
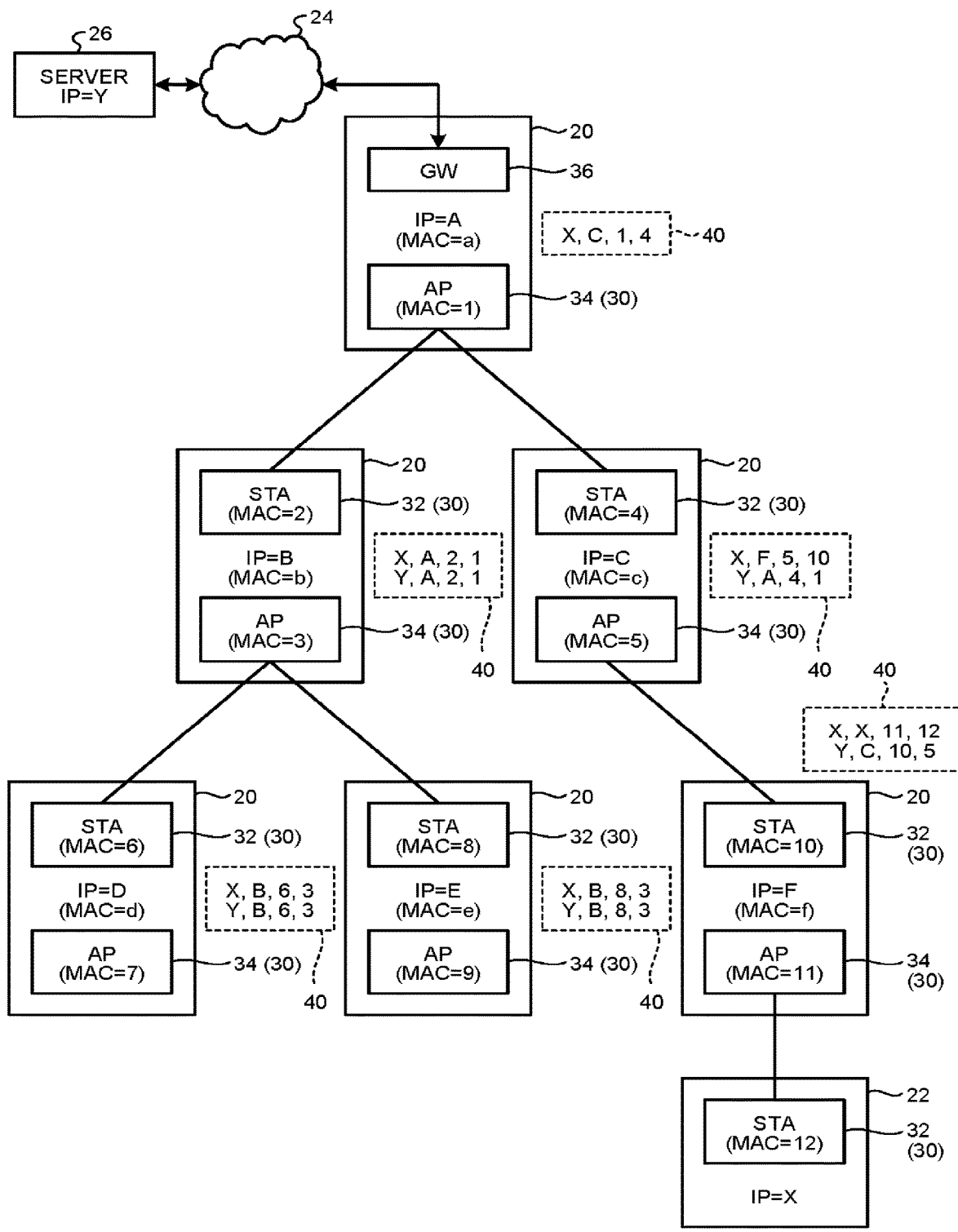
FIG. 2 is a diagram illustrating an IP address and a MAC address assigned to a node.

FIG. 2 is a diagram illustrating an example of an IP address and a MAC address assigned to the node 20, and a routing table 40 stored in the node 20.

An IP address is assigned to each of the nodes 20 and the terminal device 22. The IP address is one of network addresses indicating an address on a network. Due to this, the network system 10 and the external network 24 can transfer a packet (IP packet) to the terminal device 22 (or the server 26) having a designated IP address in accordance with a predetermined network protocol (for example, the IP).

A proper MAC address is assigned to each of the ports 30 included in the nodes 20 and the terminal device 22. The MAC address is a physical address for identifying a device in a data link layer as a layer lower than the predetermined network protocol (for example, the IP). By identifying the device using the MAC address, the network system 10 can transmit a wireless frame transmitted from any of the nodes 20 (or the terminal device 22) to the node 20 (or the terminal device 22) having a designated MAC address.

One MAC address is assigned to each of the nodes 20 as a whole separately from the MAC address assigned to the port 30.

The data link layer is divided into a MAC sub-layer on a physical layer side (lower layer side) and a Logical Link Control (LLC) sub-layer on a network layer side (upper layer side). When performing processing prescribed in the MAC sub-layer on data to be transmitted/received, each of the nodes 20 uses the MAC address assigned to any of the ports 30 that is selected.

When performing processing prescribed in the LLC sub-layer on data to be transmitted/received, each of the nodes 20 uses the MAC address assigned to the node 20 as a whole. Thus, for example, when performing processing prescribed in the LLC sub-layer on received data, each of the nodes 20 replaces the MAC address assigned to the port 30 with the MAC address assigned to the node 20 as a whole.

FIG. 3 is a diagram illustrating an example of the routing table 40. Each of the nodes 20 stores, for example, the routing table 40 as illustrated in FIG. 3.

The routing table 40 stores a final destination IP address, a next destination IP address, a transmission MAC address (first physical address), and a reception MAC address (second physical address) to be associated with each of a plurality of second devices as final destinations of the data.

The final destination IP address is the IP address of the second device as the final destination of the data. The final destination IP address may be a global address, or a private address in the network system 10. In a case in which the server 26 on the external network 24 is the second device as the final destination, the final destination IP address may be a global IP address of the server 26, an IP address assigned to the network to which the server 26 is connected, or an IP address of the node 20 at the root position connected to the external network 24.

The next destination IP address is an IP address assigned to an adjacent device (the node 20 or the terminal device 22) that is made to subsequently receive the wireless frame when transmitting data to the second device (corresponding second device) as the final destination.

The transmission MAC address is a MAC address assigned to the port 30 connected to the adjacent device (the node 20 or the terminal device 22) that is made to subsequently receive the wireless frame via a wireless communication line when transmitting data to the second device (corresponding second device) as the final destination.

The reception MAC address is a MAC address assigned to the port 30 of the adjacent device (the node 20 or the terminal device 22) that is made to subsequently receive the wireless frame when transmitting data to the second device (corresponding second device) as the final destination.

By using the routing table 40, the node 20 can select appropriate one of the ports 30 when receiving the IP packet from a layer upper than the data link layer and transmitting the received data to be included in the wireless frame, or when transferring the wireless frame received from one of the nodes 20 (or the terminal device 22) to another node 20 (or another terminal device 22). The node 20 can transmit the wireless frame to the port 30 of an appropriate device from the selected port 30.

Figure 4:
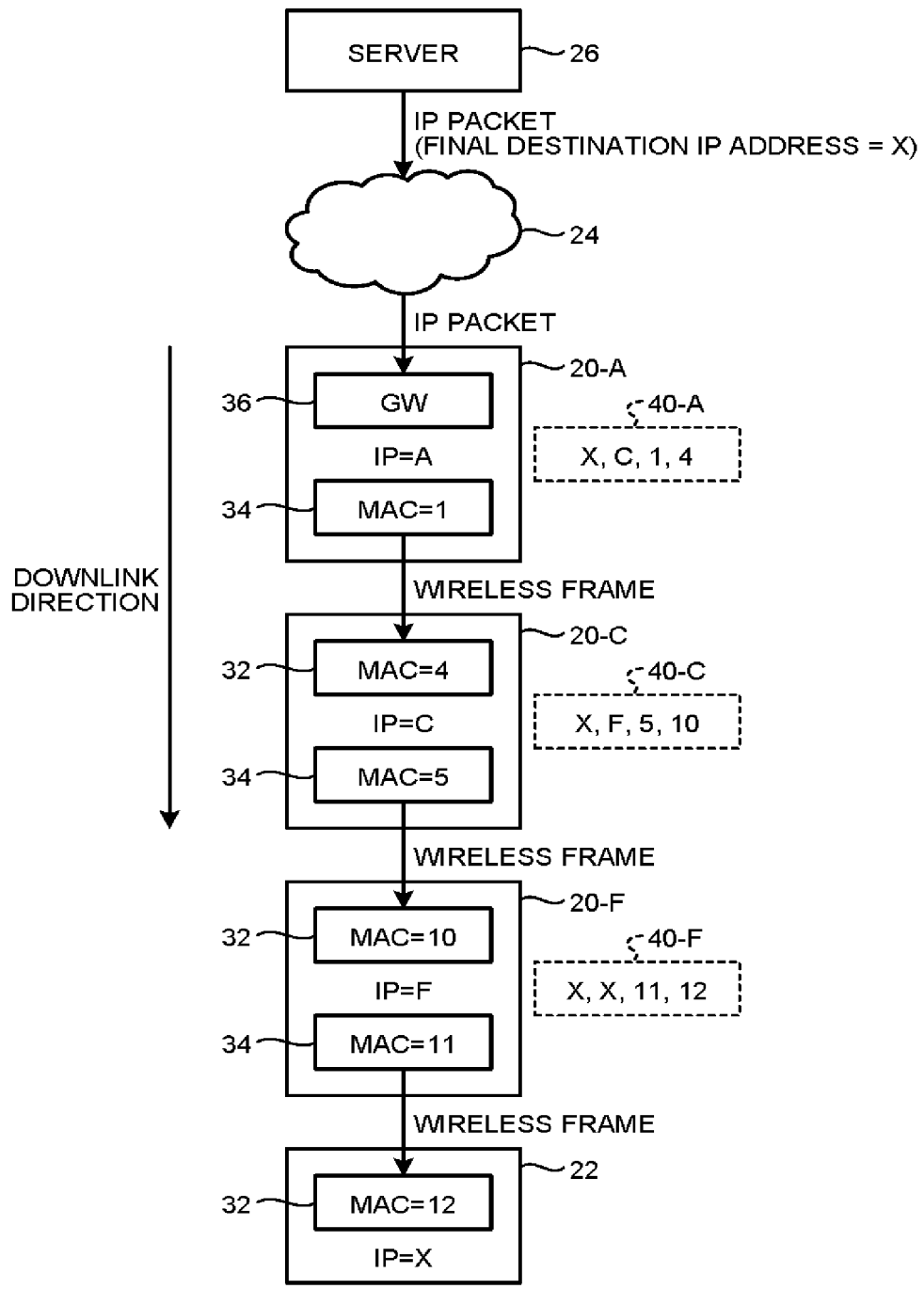
FIG. 4 is a diagram illustrating an example of data transfer to a downlink direction side.

FIG. 4 is a diagram illustrating an example of data transfer to a downlink direction side. When transferring the data from the server 26 on the external network 24 to the terminal device 22, the network system 10 performs processing as follows.

The server 26 transmits, to the external network 24, an IP packet the final destination of which is the terminal device 22 (IP address=X) connected to the network system 10. In this case, a node 20-A at the root position acquires, from the external network 24, the IP packet transmitted from the server 26.

The node 20-A acquires, from the gateway port 36, the IP packet in which X is written as the IP address of the final destination. The node 20-A acquires, from a routing table 40-A, the transmission MAC address ("1") and the reception MAC address ("4") corresponding to X as the final destination. Subsequently, the node 20-A selects the access point port 34 to which the acquired transmission MAC address ("1") is assigned. The node 20-A then transmits the wireless frame storing the IP packet to a node 20-C to which the acquired reception MAC address ("4") is assigned.

The node 20-C acquires the wireless frame in which X is written as the IP address of the final destination through the station port 32 to which the MAC address ("4") is assigned. The node 20-C acquires, from a routing table 40-C, the transmission MAC address ("5") and the reception MAC address ("10") corresponding to X as the final destination. Subsequently, the node 20-C selects the access point port 34 to which the acquired transmission MAC address ("5") is assigned. The node 20-C then transmits the wireless frame storing the IP packet to a node 20-F to which the acquired reception MAC address ("10") is assigned.

The node 20-F acquires the wireless frame in which X is written as the IP address of the final destination through the station port 32 to which the MAC address ("10") is assigned. The node 20-F acquires, from a routing table 40-F, the transmission MAC address ("11") and the reception MAC address ("12") corresponding to X as the final destination. Subsequently, the node 20-F selects the access point port 34 to which the acquired transmission MAC address ("11") is assigned. The node 20-F then transmits the wireless frame storing the IP packet to the terminal device 22 to which the acquired reception MAC address ("12") is assigned.

As described above, the network system 10 can transfer, to the terminal device 22, the data transmitted from the server 26 on the external network 24.

Figure 5:
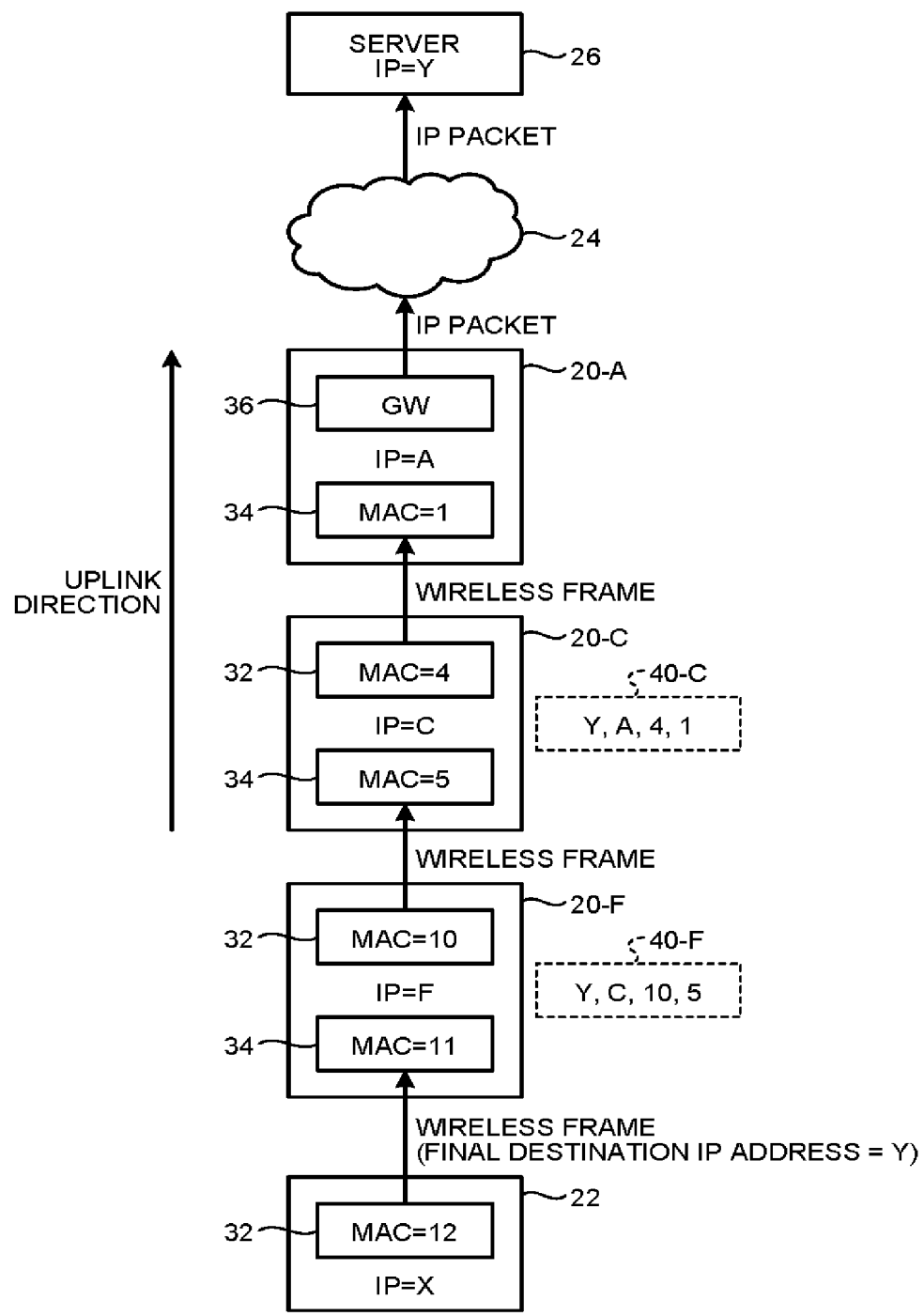
FIG. 5 is a diagram illustrating an example of data transfer to an uplink direction side.

FIG. 5 is a diagram illustrating an example of data transfer to an uplink direction side. When transferring the data from the terminal device 22 to the server 26 on the external network 24, the network system 10 performs processing as follows.

The terminal device 22 transmits the wireless frame including the IP packet the final destination of which is the server 26 (IP address=Y) connected to the external network 24. In this case, the node 20-F connected to the terminal device 22 via a wireless communication line acquires the wireless frame from the terminal device 22.

The node 20-F acquires, through the access point port 34, the wireless frame including the IP packet in which Y is written as the IP address of the final destination. The node 20-F acquires, from the routing table 40-F, the transmission MAC address ("10") and the reception MAC address ("5") corresponding to Y as the final destination. Subsequently, the node 20-F selects the station port 32 to which the acquired transmission MAC address ("10") is assigned. The node 20-F then transmits the wireless frame including the IP packet to the node 20-C to which the acquired reception MAC address ("5") is assigned.

The node 20-C acquires, through the access point port 34, the wireless frame including the IP packet in which Y is written as the IP address of the final destination. The node 20-C acquires, from the routing table 40-C, the transmission MAC address ("4") and the reception MAC address ("1") corresponding to Y as the final destination. Subsequently, the node 20-C selects the station port 32 to which the acquired transmission MAC address ("4") is assigned. The node 20-C then transmits the wireless frame including the IP packet to the node 20-A to which the acquired reception MAC address ("1") is assigned.

The node 20-A acquires, through the access point port 34, the wireless frame including the IP packet in which Y is written as the IP address of the final destination. The node 20-A extracts the IP packet from the wireless frame. The node 20-A outputs the IP packet in which Y is written as the IP address of the final destination to the external network 24 through the gateway port 36. The server 26 then acquires, from the external network 24, the IP packet in which Y is written as the IP address of the final destination.

As described above, the network system 10 can transfer the data transmitted from the terminal device 22 to the server 26 on the external network 24.

Figure 6:
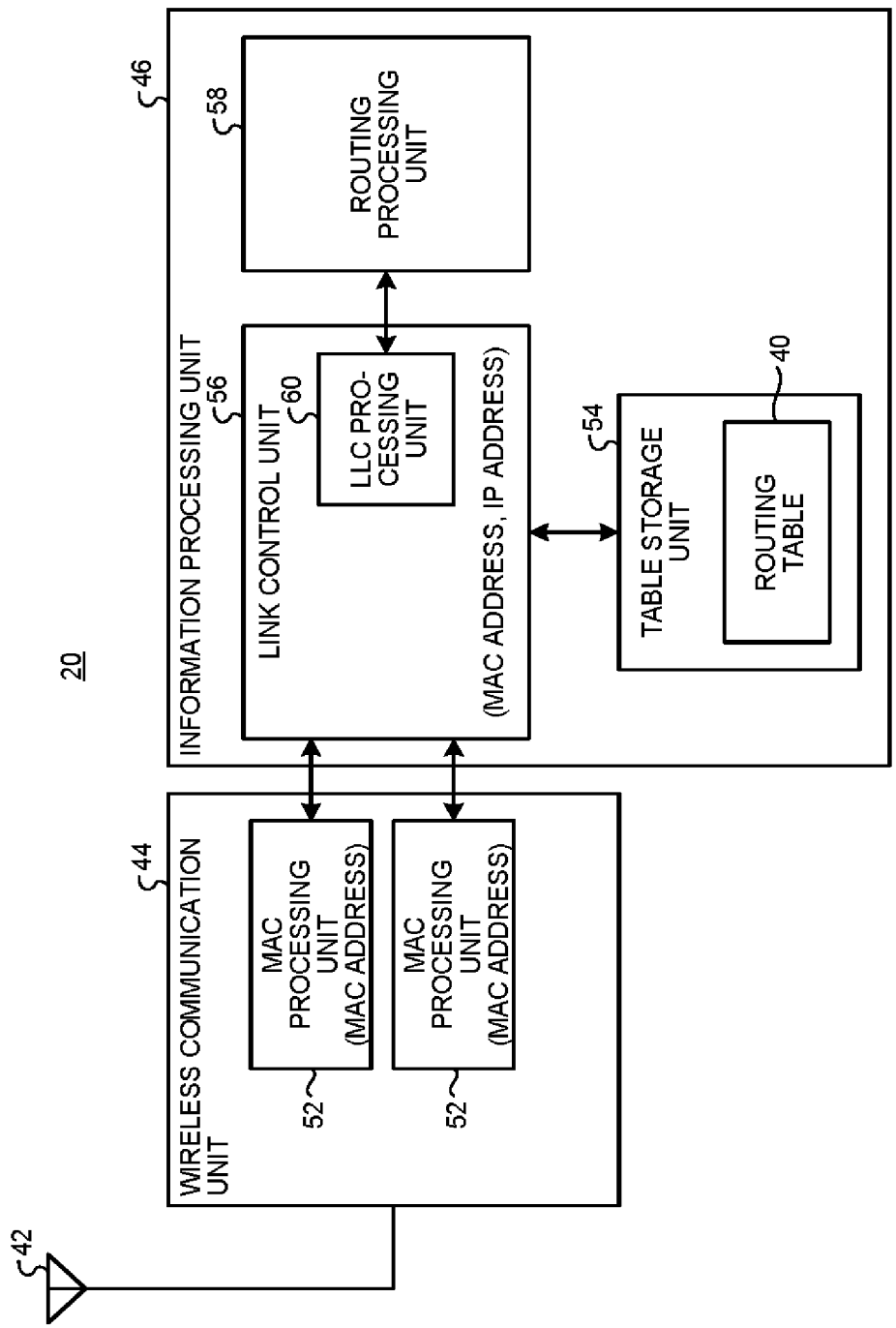
FIG. 6 is a diagram illustrating a configuration of the node.

FIG. 6 is a diagram illustrating a configuration of the node 20. The node 20 includes an antenna 42, a wireless communication unit 44, and an information processing unit 46. The antenna 42 emits radio waves to the second device, and acquires radio waves emitted from the second device.

The wireless communication unit 44 modulates the wireless frame in accordance with a prescription for a physical layer of a predetermined wireless communication scheme (for example, the IEEE 802.11) to generate a transmission signal, and transmits the generated transmission signal via the antenna 42. The wireless communication unit 44 receives a reception signal transmitted from the second device via the antenna 42, and demodulates the reception signal in accordance with the prescription of the predetermined wireless communication scheme to generate the wireless frame.

The wireless communication unit 44 further includes a plurality of MAC processing units 52. Different MAC addresses are assigned to the respective MAC processing units 52. Each of the MAC processing units 52 performs, by using the assigned MAC address, data processing in accordance with a sub-layer on a physical layer side (for example, a MAC sub-layer prescribed in the IEEE 802.11) when dividing the data link layer into two layers.

At the time of reception, in the wireless communication unit 44, one MAC processing unit 52 to which the reception MAC address included in the received wireless frame is assigned operates among the MAC processing units 52. At the time of transmission, in the wireless communication unit 44, one MAC processing unit 52 selected by the information processing unit 46 operates among the MAC processing units 52.

Each of the MAC processing units 52 operates in cooperation with a processing circuit of the physical layer of the wireless communication unit 44, and functions as the port 30 of the wireless communication unit 44. That is, the wireless communication unit 44 can function as the ports 30 to which the MAC addresses are respectively assigned by including the MAC processing units 52. Each of the ports 30 can transmit/receive the wireless frame to/from the second device (for example, another node 20 or the terminal device 22) via a wireless communication line.

In the present embodiment, the MAC processing units 52 are included in the wireless communication unit 44. Alternatively, the MAC processing units 52 may be included in the information processing unit 46.

The information processing unit 46 includes a table storage unit 54, a link control unit 56, and a routing processing unit 58. The table storage unit 54 stores the routing table 40.

To the link control unit 56, assigned is a MAC address different from the MAC addresses assigned to the ports 30 included in the wireless communication unit 44. The MAC address assigned to the link control unit 56 is an address of the node 20 in the data link layer.

An IP address is also assigned to the link control unit 56. The IP address assigned to the link control unit 56 is an address of the node 20 in the network layer.

The link control unit 56 includes an LLC processing unit 60. The LLC processing unit 60 performs processing in accordance with a sub-layer on the network layer side (for example, an LLC sub-layer prescribed in the IEEE 802.2) when dividing the data link layer into two layers using the MAC address assigned to the link control unit 56.

The routing processing unit 58 performs processing in accordance with a prescription of the network layer (for example, the IP) using the IP address as the address of the node 20 in the network layer.

Figure 7:
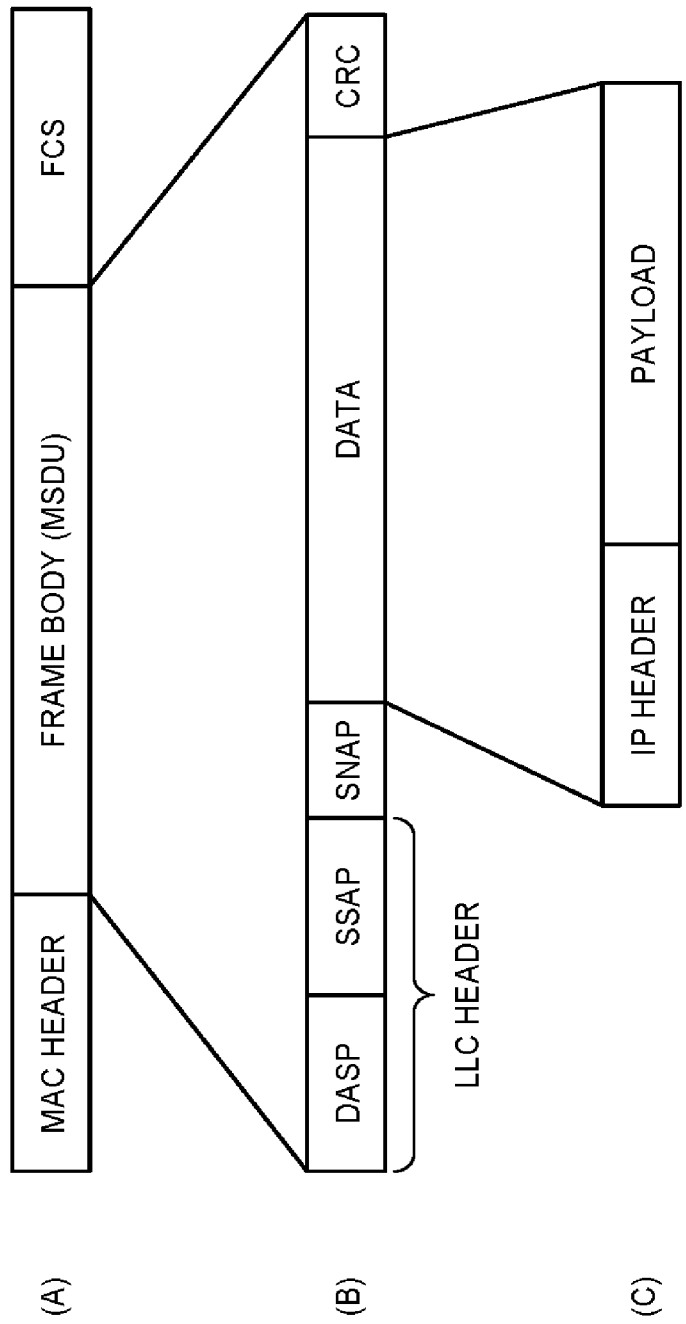
FIG. 7 is a diagram illustrating configurations of a MAC frame, an LLC frame, and an IP packet.

FIG. 7 is a diagram illustrating configurations of a MAC frame, an LLC frame, and an IP packet.

FIG. 7 illustrates the MAC frame conforming to a standard of the IEEE 802.11 at (A). The MAC frame is an example of the wireless frame. FIG. 7 illustrates a data frame for transferring data between devices in the MAC frame at (A). The MAC frame also includes a control frame used for access control between devices, a management frame for transferring management information, and the like in addition to the data frame.

The MAC frame includes a MAC header, a frame body, and a Frame Check Sequence (FCS). For example, the MAC header at least includes a transmission MAC address (TA) and a reception MAC address (RA). The transmission MAC address is a MAC address assigned to a device that transmits the MAC frame. The reception MAC address is a MAC address assigned to a device that receives the MAC address.

The MAC header may further include a type of the MAC frame, a MAC address of a device that generates the MAC frame first, a MAC address of a device as a final destination of the MAC frame, and the like. In a case in which the MAC frame is broadcasted, the MAC header includes a broadcast address. In a case in which the MAC frame is multicasted, the MAC header includes a multicast address. The MAC header may also include information for identifying a transmission period, whether the MAC frame is a MAC frame the transmission of which is retried, whether transfer is performed in the uplink direction or the downlink direction, and the like.

The frame body includes entity data. The frame body of the data frame is called a MAC service data unit (MSDU), and includes the LLC frame illustrated at (B) in FIG. 7. The frame body of the management frame includes management information that is called a MAC management protocol data unit. The control frame does not include the frame body. The FCS is a code for error detection for the MAC frame.

FIG. 7 illustrates the LLC frame conforming to a standard of the IEEE 802.2 at (B). The LLC frame is an example of a link control frame. The LLC frame includes an LLC header, a Sub-Network Access Protocol (SNAP), data, and a Cyclic Redundancy Check (CRC).

The LLC header at least includes a Destination Service Access Point (DSAP) and a Source Service Access Point (SSAP). The DSAP and the SSAP are fields for representing services of a destination and a transmission source. The DSAP and the SSAP are used for discriminating between services in a case in which a plurality of high-order protocols of the LLC sub-layer operate. In a case in which field sizes of the DSAP and the SSAP are small, the SNAP is used as an expansion field for the DSAP and the SSAP. For example, TCP/IP is applied to an upper layer of the LLC sub-layer, the SNAP is used as the expansion field for the DSAP and the SSAP.

In a case in which the IP packet includes information about a path, the node 20 performs processing as follows. First, the port 30 of the node 20 acquires the MSDU. Subsequently, the link control unit 56 checks the DSAP to determine whether the frame is the LLC frame to be raised to the LLC sub-layer. The link control unit 56 further checks whether the LLC frame that is not raised to the LLC sub-layer is the IP packet including the information about the path based on the SSAP and a field portion of the LLC header other than the DSAP such as frame type information. In a case in which the IP packet includes the information about the path in the IP header, the link control unit 56 extracts a data portion from the LLC frame to be transferred to the routing processing unit 58. The method is not limited thereto, and the node 20 may use another method to determine whether the information about the path is included in the IP packet. For example, when using the IEEE 802.11 as a wireless communication line, the node 20 may utilize a mechanism and information of IEEE 802.11 to Ethernet/IEEE 802.3 translation described in Annex.M of IEEE Std 802.11-2016 to recognize an IP packet format including the information about the path, and may determine whether to transfer the frame to the routing processing unit 58 or to process the frame by the MAC sub-layer/the LLC sub-layer.

The SNAP includes a transfer format of information, an organization code, a type of Ethernet, and the like. The data includes the IP packet illustrated at (C) in FIG. 7. The CRC is a code for error detection for the LLC frame.

FIG. 7 illustrates the IP packet conforming to the IP. The IP packet is an example of a packet at (C). The IP packet includes an IP header and a payload.

The IP header at least includes a transmission source IP address and a destination IP address. The transmission source IP address is an IP address of a device as a transmission source of the IP packet. The destination IP address is an IP address of a device as a final destination of the IP packet. The payload includes an entity of data transmitted by the IP packet. For example, the payload includes data prescribed in a transport layer such as a Transmission Control Protocol (TCP) or a User Datagram Protocol (UDP).

Figure 8:
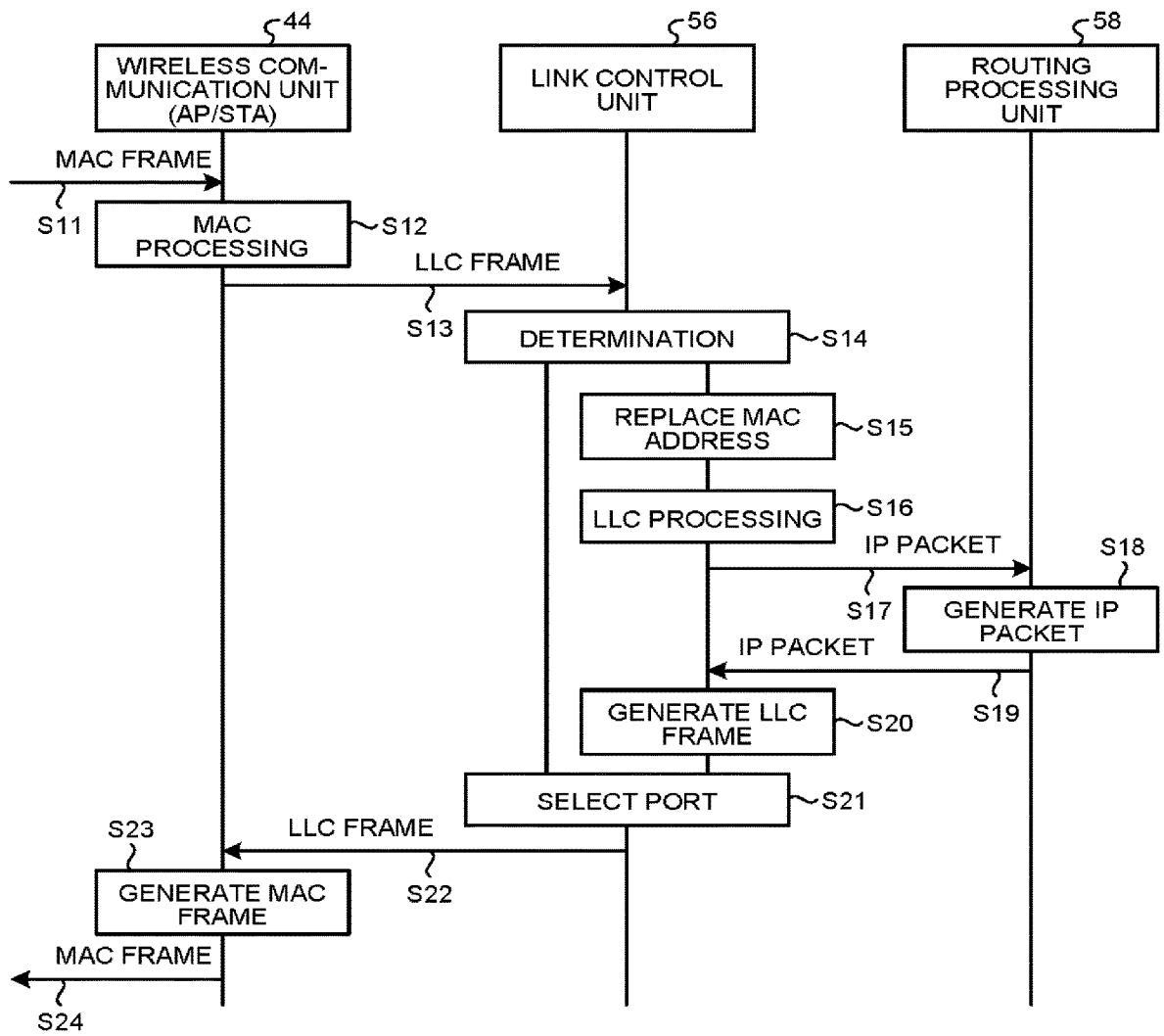
FIG. 8 is a sequence diagram illustrating a processing procedure performed by the node.

FIG. 8 is a sequence diagram illustrating a processing procedure performed by the node 20. When transmitting/receiving the MAC frame to/from the second device, the node 20 performs processing using the procedure illustrated in FIG. 8.

First, at S11, the wireless communication unit 44 receives the MAC frame addressed to itself from the second device. More specifically, the wireless communication unit 44 receives the MAC frame in a case in which the reception MAC address included in the MAC header matches the MAC address assigned to any of the ports 30. The wireless communication unit 44 also receives the MAC frame including the broadcast address or the multicast address as the reception MAC address.

Subsequently, at S12, the MAC processing unit 52 to which the reception MAC address included in the wireless communication unit 44 is assigned performs processing on the received MAC frame in accordance with a prescription of the MAC sub-layer.

Subsequently, at S13, the wireless communication unit 44 extracts the LLC frame included in the MAC frame, and passes the extracted LLC frame to the link control unit 56. In some cases, the wireless communication unit 44 may receive the MAC frame the processing for which is completed by the MAC sub-layer. In this case, the wireless communication unit 44 does not pass the LLC frame to the link control unit 56, and advances the process to S23.

At S14, the link control unit 56 determines whether to transfer the LLC frame received from the wireless communication unit 44 to the second device, or to process the acquired LLC frame by itself. For example, in a case in which a protocol number (service type) of a layer upper than the LLC sub-layer is written in the DSAP of the LLC header of the acquired LLC frame, the link control unit 56 determines to transfer the acquired LLC frame to the second device. In a case in which a service type of a layer lower than the LLC sub-layer is written in the DSAP, the link control unit 56 determines to process the acquired LLC frame by itself. The link control unit 56 may make such determination with reference to the IP header included in the IP packet instead of the DSAP.

If it is determined that the LLC frame is transferred to the second device, the link control unit 56 advances the process to S21. Due to this, in a case in which the final destination of the LLC frame acquired from the wireless communication unit 44 is the second device, the link control unit 56 can pass the LLC frame to the wireless communication unit 44 without passing the IP packet to the routing processing unit 58.

If the link control unit 56 determines to process the LLC frame by itself, the link control unit 56 advances the process to S15. At S15, the link control unit 56 replaces the MAC address assigned to the port 30 that has received the MAC frame with the MAC address assigned to the node 20 as a whole in the LLC frame acquired from the wireless communication unit 44. Subsequently, at S16, the LLC processing unit 60 included in the link control unit 56 performs processing in accordance with a prescription of the LLC sub-layer on the acquired LLC frame. Due to this, the link control unit 56 can perform data processing for the LLC sub-layer using the MAC address assigned to the node 20 as a whole.

Subsequently, at S17, the LLC processing unit 60 included in the link control unit 56 extracts the IP packet included in the LLC frame, and passes the extracted IP packet to the routing processing unit 58. Due to this, at the time of reception, the link control unit 56 can pass the IP packet included in the LLC frame received from the wireless communication unit 44 to the routing processing unit 58 when processing the LLC frame acquired from the wireless communication unit 44 by itself.

Subsequently, at S18, the routing processing unit 58 performs processing on the acquired IP packet. Additionally, at S18, when transmitting the IP packet to the second device, for example, in a case in which it is required to transfer control information required for constructing a path to another node, the routing processing unit 58 generates the IP packet. Subsequently, at S19, the routing processing unit 58 passes the generated IP packet to the link control unit 56.

Subsequently, at S20, the link control unit 56 generates the LLC frame including the acquired IP packet. That is, the link control unit 56 generates the LLC frame to be included in the MAC frame. Subsequently to S20, the link control unit 56 advances the process to S21.

At S21, the link control unit 56 selects, from among the ports 30 included in the wireless communication unit 44, the port 30 connected to the second device that is made to subsequently receive the MAC frame via a wireless communication line.

Specifically, the link control unit 56 acquires the IP address of the second device as the final destination of the MAC frame. For example, when transmitting the IP packet generated by the routing processing unit 58, the link control unit 56 acquires the IP address of the second device as the final destination of the MAC frame from the IP header of the IP packet generated by the routing processing unit 58. For example, the link control unit 56 acquires the IP address of the second device as the final destination of the MAC frame from the IP header of the IP packet included in the LLC frame received from the wireless communication unit 44.

The link control unit 56 also acquires, from the routing table 40, the transmission MAC address and the reception MAC address associated with the IP address of the second device as the final destination of the MAC frame. The link control unit 56 then selects the port 30 corresponding to the acquired transmission MAC address.

Subsequently, at S22, the link control unit 56 passes, to the wireless communication unit 44, the generated LLC frame, the acquired transmission MAC address, the acquired reception MAC address, and information for specifying the selected port 30.

Subsequently, at S23, the wireless communication unit 44 generates the MAC frame including the acquired LLC frame. Specifically, the MAC processing unit 52 corresponding to the selected port 30 in the wireless communication unit 44 generates the MAC frame. The wireless communication unit 44 causes the acquired transmission MAC address and reception MAC address to be included in the MAC header.

When receiving the MAC frame the processing for which is completed by the MAC sub-layer without performing processing by the LLC sub-layer, the MAC processing unit 52 to which the reception MAC address included in the wireless communication unit 44 is assigned generates a new MAC frame based on the processing result at S12.

Subsequently, at S24, the wireless communication unit 44 transmits the generated MAC frame to the second device to which the reception MAC address acquired by the link control unit 56 is assigned through the port 30 selected by the link control unit 56. When receiving the MAC frame the processing for which is completed by the MAC sub-layer without performing processing by the LLC sub-layer, the wireless communication unit 44 transmits the generated MAC frame through the port 30 through which the MAC frame is received at S11.

As described above, in the node 20 according to the present embodiment, the wireless communication unit 44 includes the ports 30 to which the MAC addresses are respectively assigned. At the time of transmission, the node 20 selects, from among the ports 30, the port 30 connected to the second device that is made to subsequently receive the wireless frame via a wireless communication line, and transmits the wireless frame through the selected port 30. Due to this, with the node 20 according to the present embodiment, a configuration for data transfer can be downsized.

Processing of Connecting New Node 20

Figure 9:
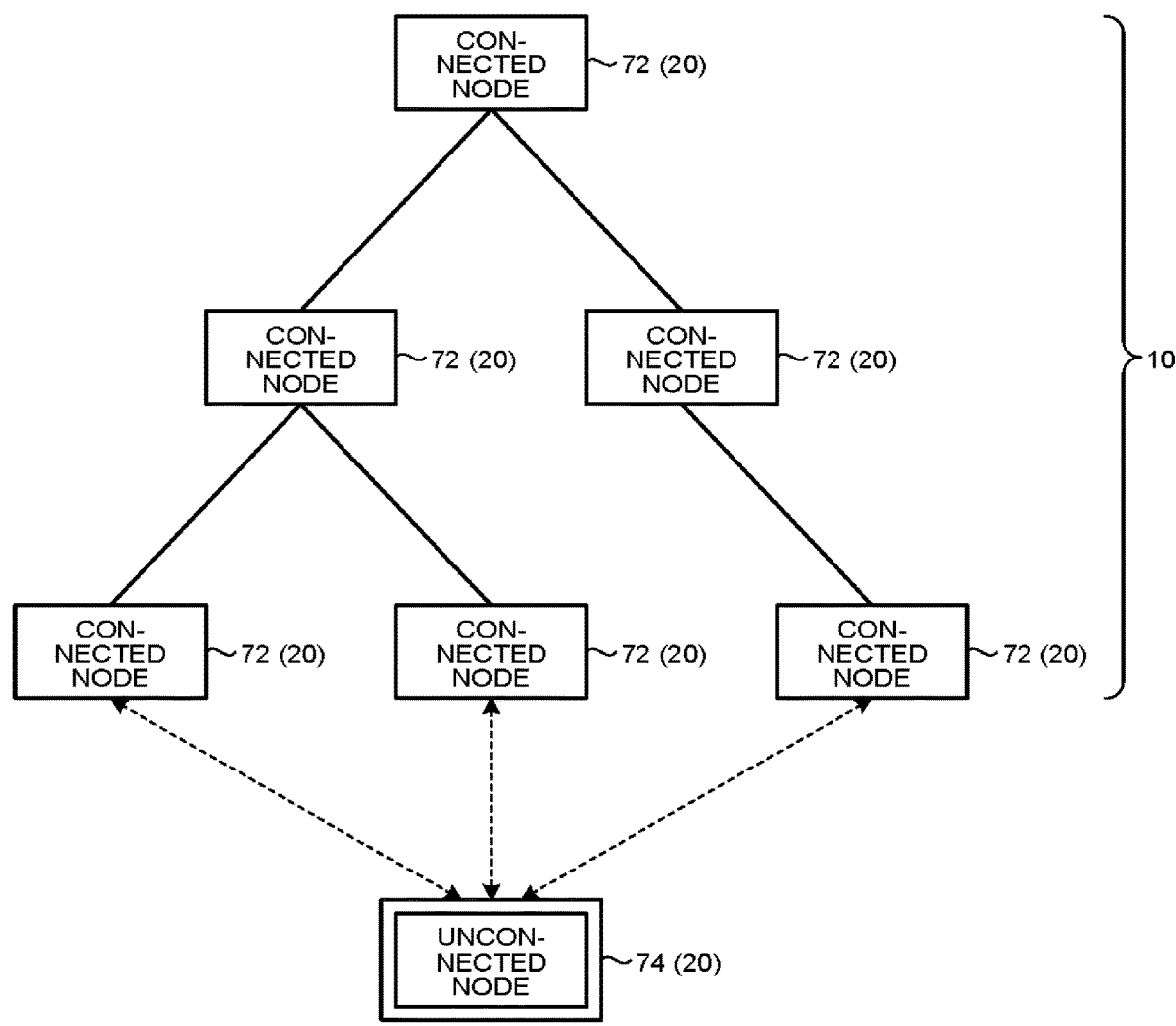
FIG. 9 is a diagram illustrating a plurality of connected nodes and an unconnected node.

FIG. 9 is a diagram illustrating a plurality of connected nodes 72 connected to a network, and an unconnected node 74 that is not connected to the network.

A device that can operate as the node 20 can be newly connected to the network system 10. The new node 20 is connected to any of the nodes 20 that have been connected to the network via a wireless communication line. The following describes processing of connecting the new node 20 to the network system 10.

The node 20 that has been connected to the network is called the connected node 72, and the node 20 that is not connected to the network is called the unconnected node 74. In the following example, the network system 10 constructs a communication path in accordance with a protocol called an IPv6 Routing Protocol for Low Power and Lossy Networks (RPL). The network system 10 may construct the communication path in accordance with another protocol, not limited to the RPL.

Figure 10:
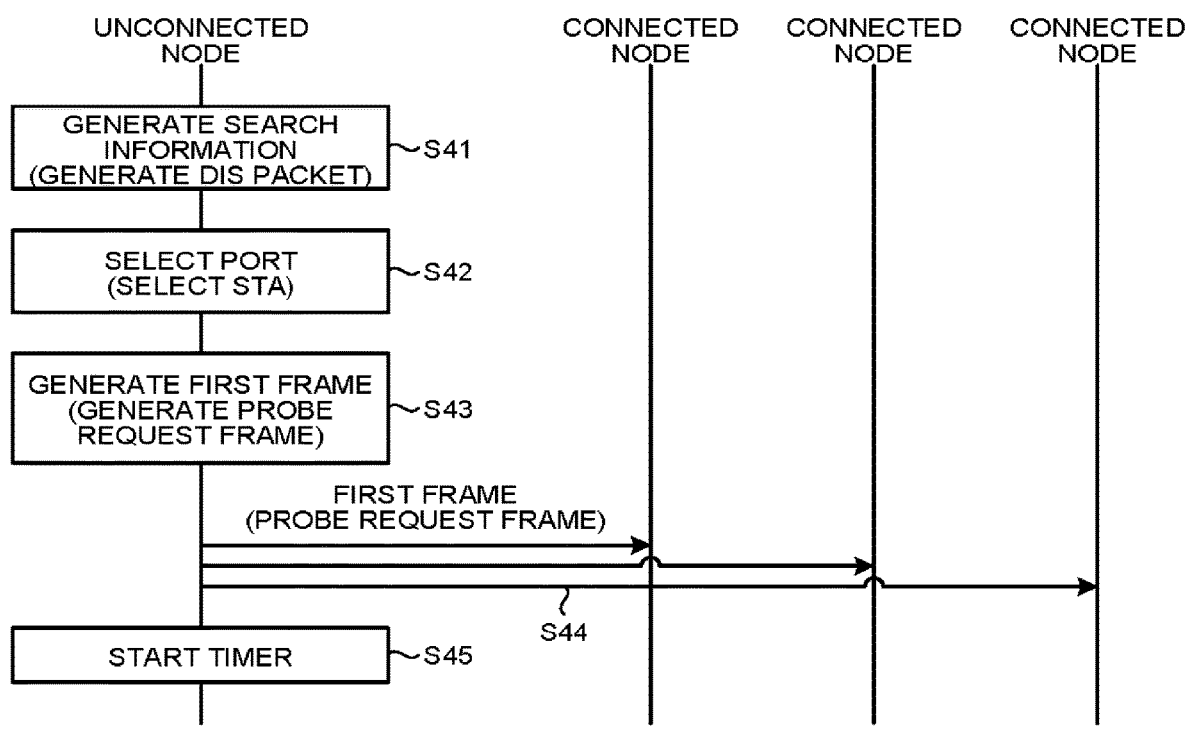
FIG. 10 is a sequence diagram illustrating processing performed by the unconnected node.

FIG. 10 is a sequence diagram illustrating processing performed by the unconnected node 74 when connecting the unconnected node 74 to the network. When not being connected to any of the nodes 20, the unconnected node 74 performs processing at S41 to S45 in FIG. 10.

First, at S41, the routing processing unit 58 of the unconnected node 74 generates search information for making connection with the connected node 72 connected to the network. The routing processing unit 58 then passes the generated search information to the link control unit 56.

For example, the routing processing unit 58 generates, as the search information, a DADAG Information Solicitation (DIS) packet as an IP packet. In this case, the routing processing unit 58 sets the transmission source IP address of the DIS packet to the IP address of itself, and sets the destination IP address of the DIS packet to multicast.

Subsequently, at S42, the link control unit 56 of the unconnected node 74 selects one station port 32 from among the ports 30. The link control unit 56 then passes the search information (for example, the DIS packet) to the wireless communication unit 44.

Subsequently, at S43, the wireless communication unit 44 of the unconnected node 74 generates a first frame including the search information. The first frame is a MAC frame that can be transmitted to another node 20 in a wireless manner even when a wireless communication line is not formed. For example, the wireless communication unit 44 generates a probe request frame including the DIS packet. In this case, the wireless communication unit 44 causes the DIS packet to be included in an expansion region of the probe request frame. The wireless communication unit 44 causes the transmission MAC address included in the MAC header to be the MAC address assigned to the station port 32 that is selected by the link control unit 56. The wireless communication unit 44 causes the reception MAC address included in the MAC header to be a multicast address.

Subsequently, at S44, the wireless communication unit 44 of the unconnected node 74 transmits the first frame (probe request frame) including the search information (DIS packet) to one or more connected nodes 72 in a multicast manner through the station port 32. The wireless communication unit 44 may cause the DIS packet to be included in another type of MAC frame to be transmitted in place of the probe request frame, the MAC frame that can be transmitted even when association is not formed.

At S45, the wireless communication unit 44 of the unconnected node 74 starts a timer for notifying that a standby time set in advance has elapsed. The standby time is a time for waiting for reception of a response (a second frame (probe response frame) described later) to the transmitted first frame (probe request frame).

Figure 11:
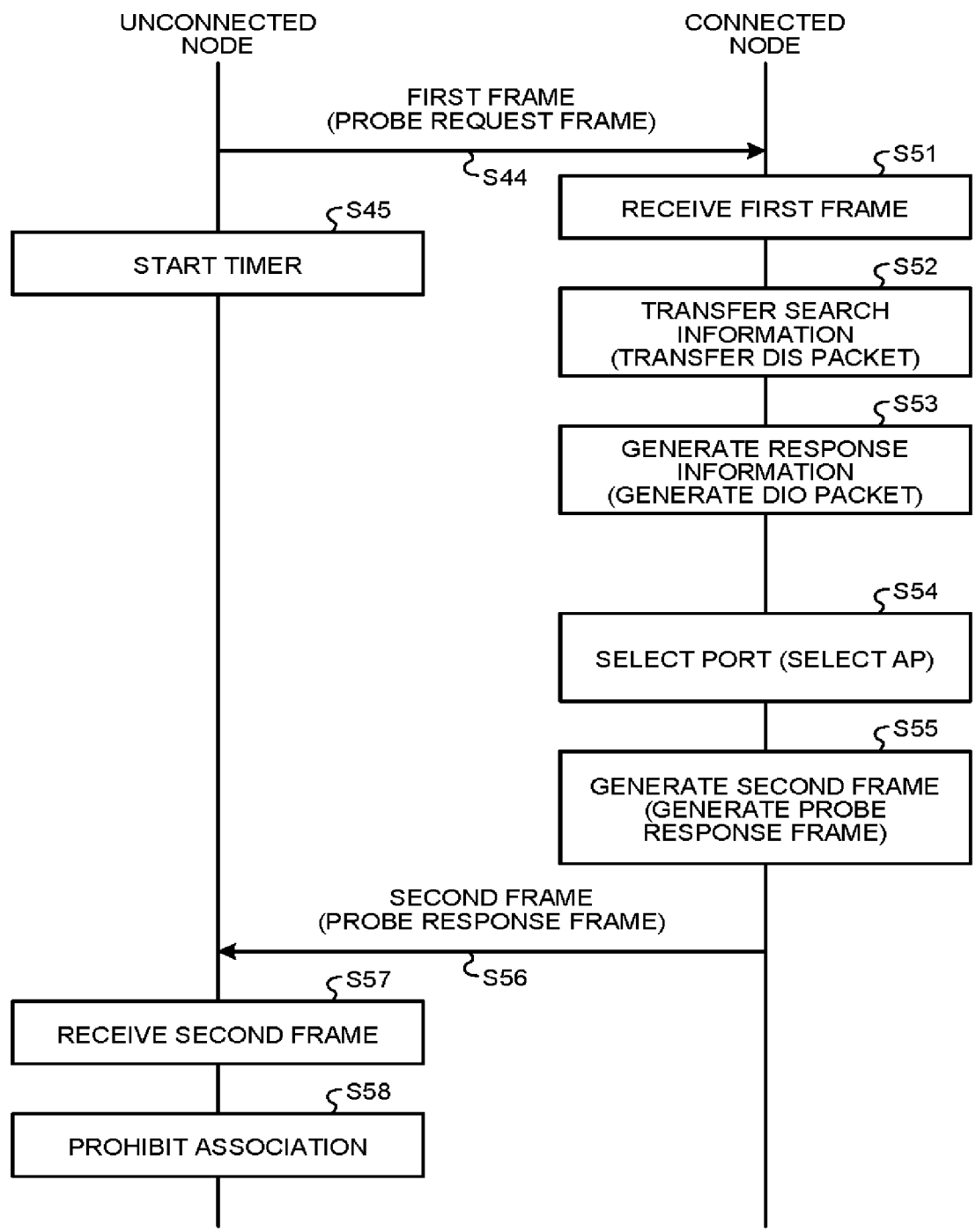
FIG. 11 is a sequence diagram illustrating a case in which the unconnected node transmits a first frame.

FIG. 11 is a sequence diagram illustrating processing performed by the connected node 72 and the unconnected node 74 in a case in which the unconnected node 74 transmits the first frame. In a case in which the connected node 72 is connected to any of the nodes 20, and the first frame is transmitted thereto from the unconnected node 74 that is not connected to any of the nodes 20, the connected node 72 performs processing at S51 to S56 in FIG. 11.

At S51, the wireless communication unit 44 of the connected node 72 receives the first frame through the access point port 34. The wireless communication unit 44 then passes the search information included in the first frame to the link control unit 56. For example, the wireless communication unit 44 receives the probe request frame through the access point port 34, and passes the DIS packet included in the received probe request frame to the link control unit 56.

Subsequently, at S52, the link control unit 56 of the connected node 72 passes the acquired search information (DIS packet) to the routing processing unit 58.

Subsequently, at S53, the routing processing unit 58 of the connected node 72 generates response information for making connection with the unconnected node 74 that has transmitted the search information based on the acquired search information. For example, the routing processing unit 58 generates a DODAG Information Object (DIO) packet as a response to the DIS packet. The routing processing unit 58 sets the transmission source IP address of the DIO packet to the IP address of itself, and sets the destination IP address of the DIO packet to the IP address of the unconnected node 74 that has transmitted the DIS packet.

Additionally, the routing processing unit 58 causes object information to be included in the response information. The object information is information used by the unconnected node 74 for evaluating the connected node 72. For example, the object information may be information representing a distance from the node 20 at the root position to the connected node 72. For example, the object information may be a rank value of the RPL. The rank value represents the number of hops from the node 20 at the root position.

The routing processing unit 58 then passes the generated response information to the link control unit 56. For example, the routing processing unit 58 passes the generated DIO packet to the link control unit 56.

Subsequently, at S54, the link control unit 56 of the connected node 72 selects one access point port 34 from among the ports 30. In this case, the link control unit 56 selects the access point port 34 that has received the first frame (probe request frame). The link control unit 56 then passes the response information (DIO packet) to the wireless communication unit 44.

Subsequently, at S55, the wireless communication unit 44 of the connected node 72 generates the second frame including the response information. The second frame is the MAC frame that can be transmitted to another node 20 in a wireless manner even when a wireless communication line is not formed. For example, the wireless communication unit 44 generates the probe response frame including the DIO packet. In this case, the wireless communication unit 44 causes the DIO packet to be included in an expansion region of the probe response frame. The wireless communication unit 44 causes the transmission MAC address included in the MAC header to be the MAC address assigned to the access point port 34 selected by the link control unit 56. The wireless communication unit 44 also causes the reception MAC address included in the MAC header to be the MAC address of the station port 32 of the unconnected node 74 that has transmitted the search information (DIS packet).

Subsequently, at S56, the wireless communication unit 44 of the connected node 72 transmits the second frame (probe response frame) including the response information (DIO packet) to the station port 32 of the unconnected node 74 in a unicast manner through the access point port 34. The wireless communication unit 44 may cause the DIO packet to be included in another type of MAC frame to be transmitted in place of the probe response frame, the MAC frame that can be transmitted even when association is not formed.

Figure 12:
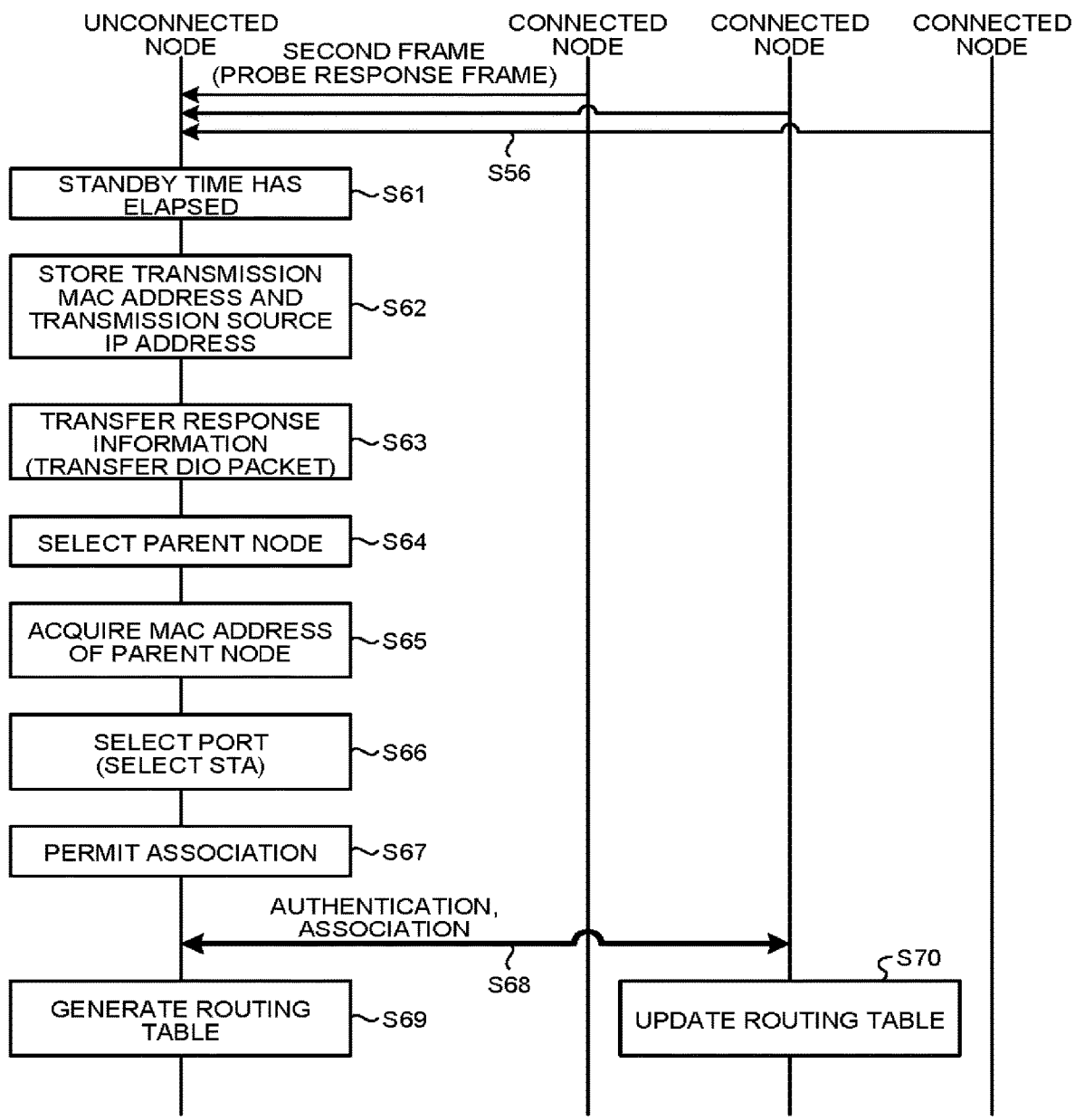
FIG. 12 is a sequence diagram illustrating a case in which the connected node transmits a second frame.

In a case in which one or more second frames (probe response frames) are transmitted from one or more connected nodes 72 in a unicast manner in response to multicast transmission of the first frame (probe request frame), the unconnected node 74 performs processing at S57 to S58 in FIG. 11 and processing at S61 to S69 in FIG. 12.

At S57, the wireless communication unit 44 of the unconnected node 74 receives the second frame (probe response frame) through the station port 32. The wireless communication unit 44 then passes the response information (DIO packet) included in the second frame to the link control unit 56.

Subsequently, at S58, the wireless communication unit 44 of the unconnected node 74 prohibits connection processing for association between itself and the connected node 72 that has transmitted the response information (DIO packet). For example, when receiving the probe response frame after transmitting the probe request frame, the wireless communication unit 44 automatically starts to perform connection processing for association. Thus, in the present embodiment, the wireless communication unit 44 prohibits such connection processing. For example, the wireless communication unit 44 may stop transmitting a beacon to prohibit connection processing for association from the outside. Additionally, triggered by reception of the probe response frame including the DIO packet, the MAC processing unit 52 may put processing of association request on hold internally.

FIG. 12 is a sequence diagram illustrating processing performed by the connected node 72 and the unconnected node 74 in a case in which the connected node 72 transmits the second frame.

At S61, the wireless communication unit 44 of the unconnected node 74 determines whether the standby time has elapsed after starting the timer at S45. That is, the wireless communication unit 44 determines whether a time for waiting for reception of the second frame (probe response frame) has elapsed. The wireless communication unit 44 receives one or more second frames until the standby time elapses. The wireless communication unit 44 passes the response information (DIO packet) to the link control unit 56 each time the second frame is received. The wireless communication unit 44 advances the processing at S62 based on the probe response frame that has been received until the standby time elapses.

At S62, the link control unit 56 of the unconnected node 74 stores a group of the transmission MAC address included in the MAC header of the second frame and the transmission source IP address included in the response information (DIO packet) for each of one or more pieces of the response information (DIO packets) included in the one or more second frames.

Subsequently, at S63, the link control unit 56 of the unconnected node 74 passes the acquired one or more pieces of response information (DIO packet) to the routing processing unit 58.

Subsequently, at S64, the routing processing unit 58 of the unconnected node 74 selects, as a parent node, any one of the one or more connected nodes 72 that have transmitted the second frame based on the acquired one or more pieces of response information (DIO packet). The routing processing unit 58 passes the IP address of the connected node 72 selected as the parent node to the link control unit 56.

For example, by evaluating the object information included in the DIO packet with a predetermined object function, the routing processing unit 58 selects one connected node 72 that is optimum as the parent node. For example, the routing processing unit 58 selects, as the parent node, the connected node 72 the rank value (the number of hops from the node 20 at the root position in the tree structure) of which is the smallest among the one or more connected nodes 72 that have transmitted the second frame based on information included in the one or more pieces of response information. Alternatively, the routing processing unit 58 may select, as the parent node, one connected node 72 that can receive a signal having the highest radio wave intensity from among the one or more connected nodes 72 that have transmitted the second frame. The routing processing unit 58 may also select, as the parent node, the connected node 72 that has the smallest rank value and can receive a signal having radio wave intensity equal to or higher than a threshold from among the one or more connected nodes 72 that have transmitted the second frame.

Subsequently, at S65, the link control unit 56 of the unconnected node 74 acquires a group corresponding to one connected node 72 selected as the parent node from among groups of the transmission MAC address and the transmission source IP address stored at S62 based on the IP address of the acquired parent node. The link control unit 56 then acquires the transmission MAC address included in the acquired group as the MAC address of the access point port 34 of the connected node 72 selected as the parent node.

Subsequently, at S66, the link control unit 56 of the unconnected node 74 selects, from among the ports 30, the station port 32 that has received the second frame from the connected node 72 selected as the parent node. The link control unit 56 then notifies the wireless communication unit 44 of the MAC address of the selected station port 32.

Subsequently, at S67, the wireless communication unit 44 of the unconnected node 74 permits connection processing for association between the selected station port 32 and the access point port 34 of the connected node 72 selected as the parent node. The wireless communication unit 44 starts to transmit the beacon again, for example.

Subsequently, at S68, the station port 32 of the wireless communication unit 44 of the unconnected node 74 performs connection processing for association between itself and the access point port 34 of the connected node 72 selected as the parent node. For example, the station port 32 of the wireless communication unit 44 performs authentication processing and association processing between itself and the access point port 34 of the parent node. Due to this, in a case in which the parent node is selected, the wireless communication unit 44 of the unconnected node 74 can form a wireless communication line between itself and the parent node.

Subsequently, at S69, the child node (original unconnected node 74) that has formed a new wireless communication line between itself and the connected node 72 (parent node) generates the routing table 40, and causes the table storage unit 54 to store the generated routing table 40. For example, the child node (original unconnected node 74) acquires information stored in the routing table 40 that is stored in the table storage unit 54 of the parent node, and generates a new routing table 40 based on the acquired information.

Additionally, at S70, the parent node (original connected node 72) that has formed a new wireless communication line between itself and the child node updates the routing table 40 stored in the table storage unit 54. For example, the parent node (original connected node 72) adds, to the routing table 40, information (the final destination IP address, the next destination IP address, the transmission MAC address, and the reception MAC address) the final destination of which is the child node that has newly formed the wireless communication line.

To generate and update the routing table 40 as described above, the connected node 72 (parent node) and the unconnected node 74 (child node) may generate notification information. The connected node 72 (parent node) and the unconnected node 74 (child node) may transmit the generated notification information to each other while causing the generated notification information to be included in a predetermined wireless frame. For example, the connected node 72 (parent node) and the unconnected node 74 (child node) may generate, as the notification information, a Destination Advertisement Object (DAO) packet as the IP packet. The connected node 72 (parent node) and the unconnected node 74 (child node) may transmit the generated DAO packet to each other while causing the generated DAO packet to be included in an expansion region of an association frame.

Figure 13:
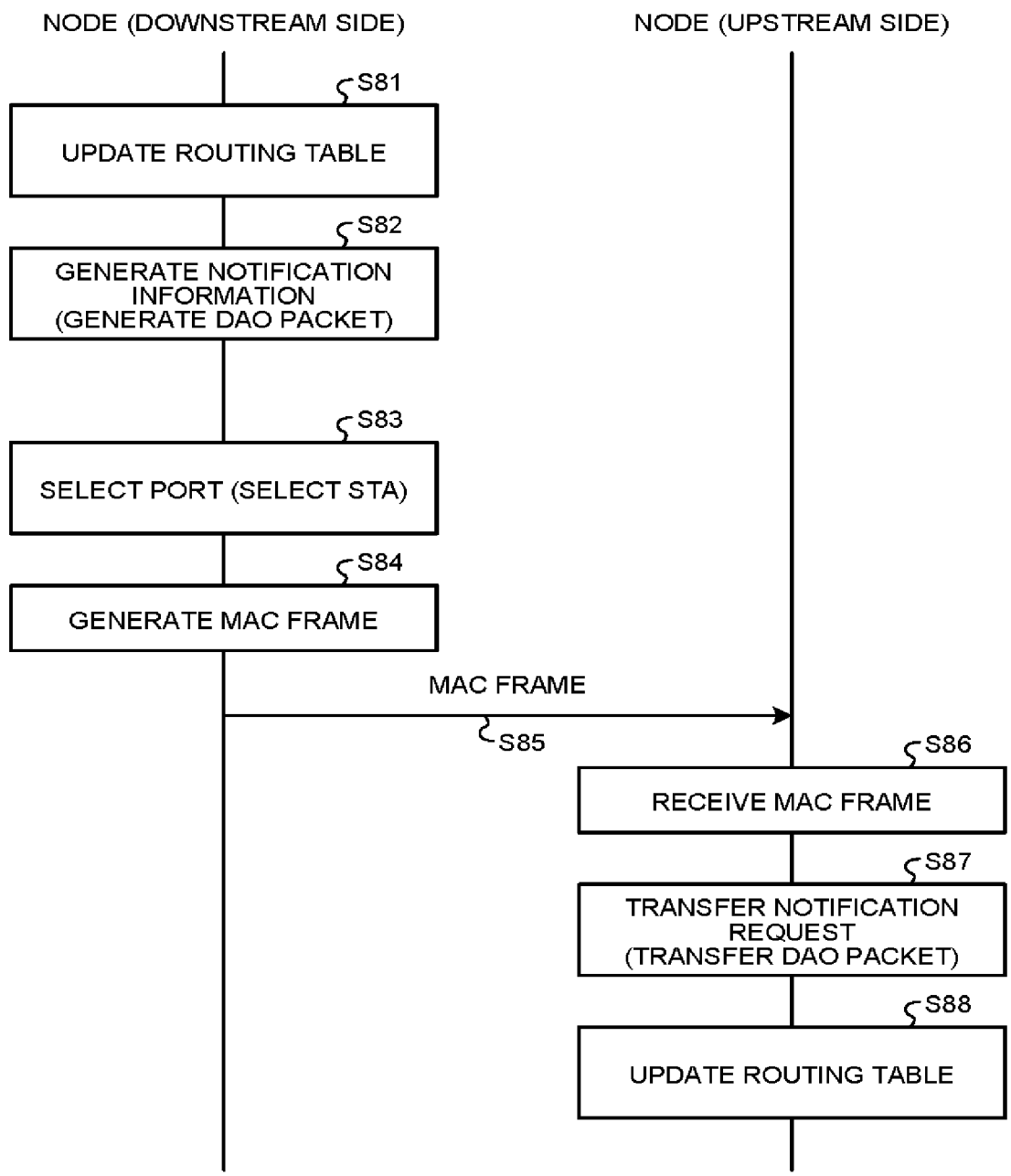
FIG. 13 is a sequence diagram illustrating when the routing table is updated.

FIG. 13 is a sequence diagram illustrating processing performed by the downstream node 20 and the upstream node 20 in a case in which the downstream node 20 updates the routing table 40.

For example, it is assumed that a wireless communication line is newly formed between the parent node and the child node after the processing illustrated in FIG. 10 to FIG. 12 is performed. In this case, at S81, the downstream node 20 adds, to the routing table 40, the information (the final destination IP address, the next destination IP address, the transmission MAC address, and the reception MAC address) for transferring the data to the newly added child node. In this case, the final destination IP address may indicate the IP address of the node 20-A including the gateway port 36.

Subsequently, at S82, the routing processing unit 58 of the downstream node 20 generates notification information including information indicating updated content to the routing table 40 (information for transferring the data to the newly added child node). The routing processing unit 58 then passes the generated notification information to the link control unit 56. For example, the routing processing unit 58 generates the DAO packet as the notification information. In this case, the routing processing unit 58 sets the transmission source IP address of the DAO packet to the IP address of itself, and sets the destination IP address of the DAO packet to the IP address of the parent node.

Subsequently, at S83, the link control unit 56 of the downstream node 20 selects one station port 32 from among the ports 30. The link control unit 56 then passes the notification information (DAO packet) to the wireless communication unit 44.

Subsequently, at S84, the wireless communication unit 44 of the downstream node 20 generates the MAC frame including the notification information. In this case, the wireless communication unit 44 causes the transmission MAC address included in the MAC header to be the MAC address assigned to the station port 32 selected by the link control unit 56. The wireless communication unit 44 also causes the reception MAC address included in the MAC header to be the MAC address assigned to the access point port 34 of the parent node.

Subsequently, at S85, the wireless communication unit 44 of the downstream node 20 transmits the MAC frame including the notification information to the parent node in a unicast manner through the station port 32.

Subsequently, at S86, the wireless communication unit 44 of the upstream node 20 (parent node) receives the MAC frame including the notification information through the access point port 34. The wireless communication unit 44 then passes the notification information included in the MAC frame to the link control unit 56. For example, the wireless communication unit 44 receives the MAC frame through the access point port 34, and passes the DAO packet included in the received MAC frame to the link control unit 56.

Subsequently, at S87, the link control unit 56 of the upstream node 20 passes the acquired notification information (DAO packet) to the routing processing unit 58.

Subsequently, at S88, the routing processing unit 58 of the upstream node 20 updates the routing table 40 based on the acquired notification information. The routing processing unit 58 of the upstream node 20 updates the routing table 40 based on the information that is included in the notification information and updated for transferring the data downstream.

In a case in which more parent nodes are present, the upstream node 20 performs processing from S82 in accordance with update of the routing table 40. That is, the upstream node 20 generates a new DAO packet including information indicating updated content to the routing table 40, and transmits the DAO packet to the parent node.

As described above, in the network system 10 according to the present embodiment, the unconnected node 20 can be newly easily connected to the network to which the nodes 20 are connected. In a case in which a downstream connection relation is updated, the network system 10 according to the present embodiment transmits, to the upstream node 20, the notification information including the information updated for transferring the data downstream. Due to this, with the network system 10 according to the present embodiment, a relay station and the like having a controller function do not necessarily collect a radio wave condition, a traffic condition, and the like, so that a processing load on the node 20 is reduced, and the path can be rapidly switched.

Modification

Next, the following describes the network system 10 according to a modification of the present embodiment.

FIG. 14 is a diagram illustrating an example of a path information table storing a plurality of pieces of path information stored in the node 20 at the root position according to the modification.

In the modification, the nodes 20 are connected to each other via a wireless communication in a connection relation of a tree structure. The node 20 at the root position stores the path information table as illustrated in FIG. 14. The path information table stores the path information for each device as a final destination in the downlink direction.

When transmitting the wireless frame in the downlink direction, the node 20 at the root position acquires an IP address of a device as the final destination of the IP packet. Subsequently, the node 20 at the root position acquires, from the path information table, the path information corresponding to the acquired IP address of the device as the final destination. The node 20 at the root position stores the acquired path information in the wireless frame, and transmits the wireless frame including the path information to the downstream node 20.

FIG. 15 is a diagram illustrating an example of the path information. More specifically, illustrated is the path information when transferring the wireless frame from the node 20 at the root position having the IP address of A to the terminal device 22 having the IP address of X via the node 20 having the IP address of C and the node 20 having the IP address of F.

The path information indicates an IP address of a downstream device as the next destination for each of the nodes 20 on the path from the node 20 at the root position to the terminal device 22 as the final destination.

For example, in the example of FIG. 15, the path information includes a group of the IP address of the node 20 at the root position (source IP address_1) and the IP address of the second node 20 adjacent to the root position (destination IP address_1) downstream. The path information also includes a group of the IP address of the second node 20 (source IP address_2) and the IP address of the third node 20 adjacent to the second node 20 downstream (destination IP address_2). The path information further includes a group of the IP address of the third node 20 (source IP address_3) and the IP address of the terminal device 22 adjacent to the third node 20 downstream (destination IP address_3).

In another embodiment, when transmitting the IP packet from the node 20 at the root position to the terminal device 22 as the final destination, the IP packet is generated by causing the IP header to include the IP address of each of the nodes 20 as a path from the node 20 at the root position to the terminal device 22. In this case, the routing processing unit 58 of the node 20 that relays the IP packet on the path refers to the information of the IP header to determine the node 20 to be the next relay destination. That is, the node 20 that has received the wireless frame including the path information can acquire the IP address of the downstream device as the next destination with reference to the path information. In this way, each of the nodes 20 on the path does not necessarily include the routing table 40, so that the nodes 20 can be further downsized.

Figures 16, 17:
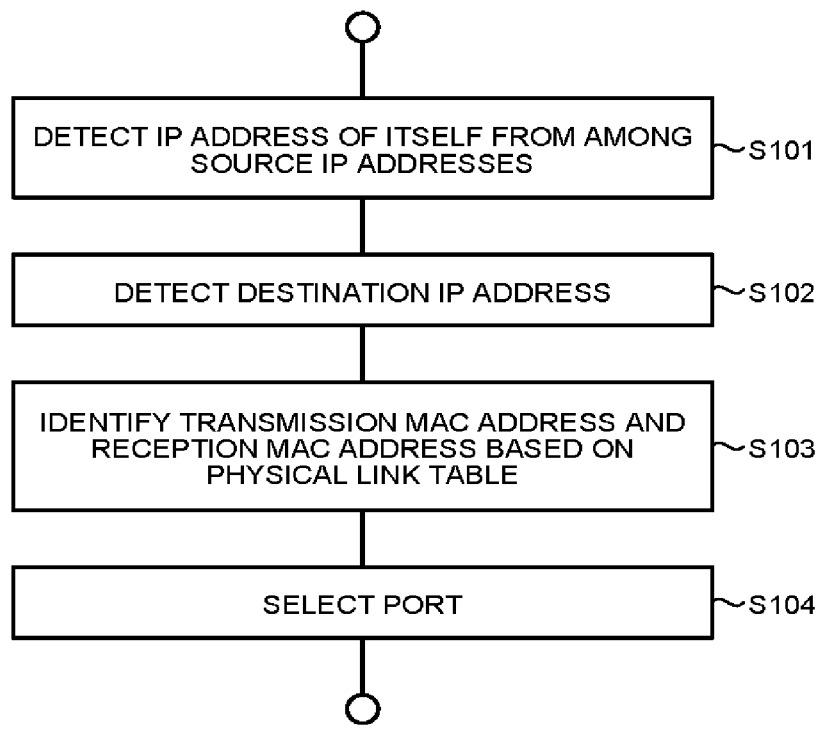
FIG. 16 is a diagram illustrating a physical link table.
FIG. 17 is a flowchart illustrating processing performed by a link control unit according to a modification.

FIG. 16 is a diagram illustrating a physical link table stored by the node 20 according to the modification. In the modification, each of the nodes 20 stores the physical link table as illustrated in FIG. 16, for example. The physical link table can be generated by transmitting an ARP packet in a multicast manner as needed at the time when the node 20 should find the MAC address corresponding to the destination IP address.

The physical link table associates the next destination IP address, the transmission MAC address, and the reception MAC address with each of one or more adjacent downstream devices adjacent downstream (the node 20 or the terminal device 22) to be stored therein.

The next destination IP address is the IP address assigned to the downstream device. The transmission MAC address is the MAC address assigned to the port 30 connected to the downstream device via a wireless communication line. The reception MAC address is the MAC address assigned to the port 30 of the downstream device.

By using such a physical link table, the node 20 can select one appropriate port 30 when transferring the wireless frame received from the upstream node 20 to the downstream device. The node 20 can transmit the wireless frame from the selected port 30 to the port 30 of an appropriate device.

FIG. 17 is a flowchart illustrating processing performed by the link control unit 56 of the node 20 at a position other than the root position according to the modification.

The wireless communication unit 44 of the node 20 receives the wireless frame including the path information from the upstream node 20. When receiving the wireless frame including the path information, the wireless communication unit 44 passes the path information and the link control frame included in the wireless frame to the link control unit 56.

When receiving the wireless frame including the path information, the link control unit 56 performs processing illustrated in FIG. 17. First, at S101, the link control unit 56 refers to the path information to detect the IP address of itself from among source IP addresses. Subsequently, at S102, the link control unit 56 detects the destination IP address grouped with the detected source IP address in the path information.

Subsequently, at S103, the link control unit 56 acquires the transmission MAC address assigned to the port 30 connected to the downstream device as the next destination via a wireless communication line and the reception MAC address assigned to the downstream device as the next destination based on the detected destination IP address and the physical link table.

Subsequently, at S104, the link control unit 56 selects the port 30 connected to the downstream device as the next destination via a wireless communication line from among the ports 30 included in the wireless communication unit 44. Specifically, the link control unit 56 selects the port 30 corresponding to the transmission MAC address acquired from the physical link table.

The link control unit 56 passes, to the wireless communication unit 44, the LLC frame, the acquired transmission MAC address, the acquired reception MAC address, and information for specifying the selected port 30. Thereafter, the wireless communication unit 44 transmits the wireless frame to the downstream device to which the reception MAC address acquired by the link control unit 56 is assigned through the selected port 30.

As described above, in the node 20 according to the modification, the wireless communication unit 44 includes the ports 30 to which the MAC addresses are respectively assigned. When transmitting the data to the downstream device, the node 20 selects the port 30 that is connected, via a wireless communication line, to the second device that is made to subsequently receive the wireless frame from among the ports 30 with reference to the path information included in the wireless frame, and transmits the wireless frame through the selected port 30. Due to this, with the node 20 according to the present embodiment, a configuration for data transfer can be downsized.

The node 20 at the root position collects information from another node 20 to generate the path information table. For example, the node 20 at the root position collects the notification information illustrated in FIG. 13 from all the nodes 20, and generates and updates the path information table based on the collected notification information.

Hardware Configuration of Information Processing Unit 46

Figure 18:
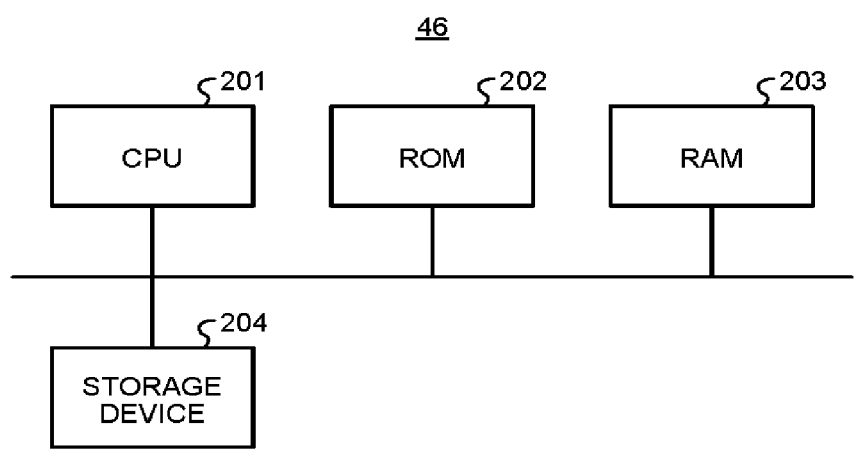
FIG. 18 is a hardware configuration diagram of an information processing unit.

FIG. 18 is a diagram illustrating an example of a hardware configuration of the information processing unit 46. The information processing unit 46 can be implemented by a configuration as illustrated in FIG. 18, for example.

The information processing unit 46 has a configuration similar to that of a normal computer. That is, the information processing unit 46 includes a central processing unit (CPU) 201, a read only memory (ROM) 202, a random access memory (RAM) 203, and a storage device 204. The CPU 201, the ROM 202, the RAM 203, and the storage device 204 are connected to each other via a bus.

The CPU 201 loads a computer program stored in the storage device 204 into the RAM 203 to be executed, and controls respective components to perform input/output or process the data. The ROM 202 stores a start program for reading out a computer program for starting an OS from the storage device 204 into the RAM 203. The RAM 203 stores the data as a working area of the CPU 201.

The storage device 204 is, for example, a hard disk drive or a flash memory. The storage device 204 stores an operating system, an application program, and data. These computer programs may be recorded and distributed in a computer-readable recording medium as an installable or executable file. The computer programs may be distributed by being downloaded from a server.

The computer program executed by the information processing unit 46 according to the embodiment is recorded and provided in a computer-readable recording medium such as a compact disc read only memory (CD-ROM), a flexible disk (FD), a compact disc recordable (CD-R), and a digital versatile disc (DVD), as an installable or executable file. The computer program executed by the information processing unit 46 according to the embodiment may be stored in a computer connected to a network such as the Internet and provided by being downloaded via the network. Furthermore, the computer program executed by the information processing unit 46 according to the embodiment may be provided or distributed via a network such as the Internet. The computer program according to the embodiment may be embedded and provided in the ROM 202, for example.

The computer program executed by the information processing unit 46 includes a link control module and a routing processing module. In the information processing unit 46, when a processor (the CPU 201) reads out a computer program from a storage medium (the storage device 204 and the like) and executes the computer program, each module is loaded into a main storage device (the RAM 203), and the processor (the CPU 201) functions as the link control unit 56 and the routing processing unit 58. The RAM 203 or the storage device 204 functions as the table storage unit 54.

In a case in which the information processing unit 46 includes a plurality of the MAC processing units 52, the computer program executed by the information processing unit 46 further includes a MAC processing module. In the information processing unit 46, when the processor (the CPU 201) reads out a computer program from the storage medium (the storage device 204 and the like) and executes the computer program, the MAC processing module is loaded into the main storage device (the RAM 203), and the processor (the CPU 201) functions as the MAC processing units 52.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A relay apparatus corresponding to a node included in nodes of a wireless network system, the relay apparatus comprising:
    wireless communication circuitry including ports configured to transmit or receive a wireless frame via a wireless communication line respectively, each of the ports being assigned with a physical address;
    a memory configured to store a routing table; and
    processor circuitry configured to select a first port connected to a first apparatus through the ports based on the routing table, if the wireless communication circuitry receives the wireless frame for a second apparatus as a final destination, wherein
    the routing table comprises, for the second apparatus:
        an IP address assigned to the first apparatus,
        a first physical address assigned to the first port corresponding to the second apparatus, and
        a second physical address assigned to a port of the first apparatus functioning as relaying between the relay apparatus and the second apparatus;
    the wireless communication circuitry is further configured to transmit the wireless frame through the first port; and
    the relay apparatus further comprises:
    routing processing circuitry, wherein
        before being connected to any of the nodes of a wireless network system,
            the routing processing circuitry generates search information indicating an own IP address, and passes the generated search information to the processor circuitry, the search information being a MAC frame,
            the processor circuitry selects one of the ports functioning as a station port, and passes the search information to the wireless communication circuitry,
            the wireless communication circuitry generates a probe request frame including the search information and information indicating a physical address assigned to the station port, and transmits the probe request frame, and
            a wireless communication line is not formed with one or more nodes of the wireless network system by which the request frame is received.

2. The relay apparatus according to claim 1, wherein
    the wireless communication circuitry receives a probe response frame through the one or more nodes of the wireless network system by which the probe request frame is received, the probe response frame including information indicating (1) an I address of the one or more nodes which transmitted the probe request frame and (2) a physical address assigned to a port which transmitted the probe response frame,
    the routing processing circuitry selects a parent node through the one or more nodes which transmitted the probe request frame,
    the processor circuitry acquires the IP address of the parent node and the physical address assigned to the port of the parent node which transmitted the probe response frame, and
    the wireless communication circuitry allows connection processing between an own station port which transmitted the probe request frame and the port of the parent node.

3. The relay apparatus according to claim 2, wherein
    the station port executes a connection process by executing certification process and association process with the port of the parent node which transmitted the probe response frame.

4. The relay apparatus according to claim 3, wherein
    the wireless communication circuitry receives notification information indicating a routing table stored in the parent node, and
    the processor circuitry updates the routing table stored in the memory based on the information indicating the routing table stored in the parent node.

5. The relay apparatus according to claim 3, wherein
    the probe request frame is transmitted in a multicast manner.

6. The relay apparatus according to claim 2, wherein
    the nodes are connected to each other via the wireless communication line in a connection relation of a tree structure, and
    the routing processing circuitry selects, as the parent node, one connected node, a number of hops of which through a node at a root position in a tree structure is smallest through the one or more connected nodes that have transmitted the probe response frames based on information included in the probe response frame.

7. The relay apparatus according to claim 1, wherein
    after the wireless communication circuitry transmits the probe request frame through the station port to one or more connected nodes in a multicast manner and until the routing processing circuitry selects a parent node, the wireless communication circuitry prohibits connection processing for association with the one or more connected nodes; and
    upon being triggered by reception of the probe response frame, the wireless communication circuitry puts processing of an association request on hold internally.

8. A relay apparatus corresponding to a node included in nodes of a wireless network system, the relay apparatus comprising:
    wireless communication circuitry including ports configured to transmit or receive a wireless frame via a wireless communication line respectively, each of the ports being assigned with a physical address;
a memory configured to store a routing table; and
processor circuitry configured to select a first port connected to a first apparatus through the ports based on the routing table, if the wireless communication circuitry receives the wireless frame for a second apparatus as a final destination, wherein
the routing table comprises, for the second apparatus:
an IP address assigned to the first apparatus,
a first physical address assigned to the first port corresponding to the first apparatus, and
a second physical address assigned to a port of the first apparatus functioning as relaying between the relay apparatus and the second apparatus; and
the wireless communication circuitry is further configured to transmit the wireless frame through the first port, wherein
when being connected to any of the nodes, and in a case in which the probe request frame is transmitted through an unconnected node out of the wireless network system, the probe request frame including information indicating an IP address of the unconnected node and a physical address assigned to a node through which the probe request frame is transmitted,
the wireless communication circuitry receives the probe request frame through one of the ports functioning as an access point port, and passes search information included in the probe request frame to the processor circuitry,
the processor circuitry passes the search information to routing processing circuitry,
the routing processing circuitry generates response information indicating an own IP address, and passes the generated response information to the processor circuitry,
the processor circuitry selects the access point port, and passes the response information to the wireless communication circuitry, and
the wireless communication circuitry generates a probe response frame including the response information and a physical address assigned to the selected port, and transmits the probe response frame to the unconnected node through the selected port.

9. The relay apparatus according to claim 8, wherein
the port, which transmits the probe response frame, executes a connection process by executing certification process and association process with a station port of the node as a child node which transmitted the probe request frame.

10. The relay apparatus according to claim 8, wherein
the probe response frame is transmitted in a unicast manner.

11. The relay apparatus according to claim 9, wherein, when newly forming a wireless communication line with a child node, the processor circuitry updates the routing table by adding the IP address of the child node and the physical address of the port of the child node which transmitted the probe request frame and the physical address of the port which transmitted the probe response frame.

12. The relay apparatus according to claim 11, wherein
after updating the routing table, the routing processing circuitry generates notification information indicating an update content of the routing table, and passes the generated notification intbrmation to the processor circuitry,
the processor circuitry selects the station port, and passes the notification information to the wireless communication circuitry, and
the wireless communication circuitry transmits the wireless frame comprising the notification information to the child node through the port.

13. The relay apparatus according to claim 8, wherein
the wireless communication circuitry receives the wireless frame including path information indicating a network address of a downstream apparatus adjacent downstream as a next destination,
when receiving the wireless frame including the path information, the processor circuitry:
acquires a first physical address as a physical address assigned to a port connected to the downstream apparatus as the next destination via a wireless communication line, and a second physical address as a physical address assigned to the downstream apparatus as the next destination based on the network address of the downstream apparatus as the next destination, and
selects a port corresponding to the acquired first physical address through the ports; and
the wireless communication circuitry transmits the wireless frame to a first apparatus to which the second physical address acquired by the processor circuitry is assigned through the selected port.

14. A wireless network system, comprising:
nodes, wherein each of the nodes comprises:
wireless communication circuitry including ports configured to transmit or receive a wireless frame via a wireless communication line respectively, each of the ports being assigned with a physical address;
a memory configured to store a routing table; and
processor circuitry configured to select a first port connected to a first apparatus through the ports based on the routing table, if the wireless communication circuitry receives the wireless frame for a second apparatus as a final destination; wherein
the routing table comprises, for the second apparatus:
an IP address assigned to the first apparatus,
a first physical address assigned to the first port corresponding to the second apparatus, and
a second physical address assigned to a port of the first apparatus functioning as relaying between a relay apparatus and the second apparatus; and
the wireless communication circuitry is further configured to transmit the wireless frame through the first port; and
the each of the nodes comprises:
routing processing circuitry, wherein
before being connected to any of the nodes of the wireless network system,
the routing processing circuitry generates search information indicating an own IP address, and passes the generated search information to the processor circuitry, the search information being a MAC frame,
the processor circuitry selects one of the ports functioning as a station port, and passes the search information to the wireless communication circuitry,
the wireless communication circuitry generates a probe request frame including the search information and information indicating a physical address assigned to the station port, and transmits the probe request frame, and a wireless communication line is not formed with the one or more nodes of the wireless network system by which the request frame is received.

15. A wireless network system, comprising:
relay apparatuses, wherein each of the relay apparatuses comprises:
wireless communication circuitry including ports configured to transmit or receive a wireless frame via a wireless communication line respectively, each of the ports being assigned with a physical address;
a memory configured to store a routing table; and
processor circuitry configured to select a first port connected to a first apparatus through the ports based on the routing table, if the wireless communication circuitry receives the wireless frame for a second apparatus as a final destination, wherein
the routing table comprises, for the second apparatus:
an IP address assigned to the first apparatus,
a first physical address assigned to the first port corresponding to the first apparatus, and
a second physical address assigned to a port of the first apparatus functioning as relaying between the relay apparatus and the second apparatus; and
the wireless communication circuitry is further configured to transmit the wireless frame through the first port, wherein
when being connected to a node, and in a case in which the probe request frame is transmitted through an unconnected node out of the wireless network system, the probe request frame including information indicating an IP address of the unconnected node and a physical address assigned to a node through which the probe request frame is transmitted,
the wireless communication circuitry receives the probe request frame through one of the ports functioning as an access point port, and passes search information included in the probe request frame to the processor circuitry,
the processor circuitry passes the search information to routing processing circuitry,
the routing processing circuitry generates response information indicating an own IP address, and passes the generated response information to the processor circuitry,
the processor circuitry selects the access point port, and passes the response information to the wireless communication circuitry, and
the wireless communication circuitry generates a probe response frame including the response information and a physical address assigned to the selected port, and transmits the probe response frame to the unconnected node through the selected port.

16. A relay method at least partially executed by circuitry corresponding to a node included in nodes of a wireless network system, wherein
the node comprises wireless communication circuitry including ports capable of transmitting or receiving a wireless frame via a wireless communication line respectively, each of the ports being assigned with a physical address, the node comprising processor circuitry and routing processing circuitry,
the method comprising:
selecting a first port connected to a first apparatus through the ports based on a routing table, if the wireless communication circuitry receives the wireless frame for a second apparatus as a final destination; wherein
the routing table comprises, for the second apparatus:
an IP address assigned to the first apparatus,
a first physical address assigned to the first port corresponding to the second apparatus, and
a second physical address assigned to the first apparatus functioning as relaying between the relay apparatus and the second apparatus; and
the method further comprises:
causing the wireless communication circuitry to transmit the wireless frame through the selected port; and
before connection being established to any of the nodes of the wireless network system,
generating, by the routing processing circuitry, search information indicating an own IP address, and passing the generated search information to the processor circuitry, the search information being a MAC frame,
selecting, by the processor circuitry, one of the ports functioning as a station port, and passing the search information to the wireless communication circuitry, and
by the wireless communication circuitry, generating a probe request frame including the search information and information indicating a physical address assigned to the station port, and transmitting the probe request frame, wherein
a wireless communication line is not tbrmed with the one or more nodes of the wireless network system by which the request frame is received.

* * * * *